United States Patent [19]

Ishiguro

[11] Patent Number: 5,257,061

[45] Date of Patent: Oct. 26, 1993

[54] RANGE FINDER FOR PASSIVE-TYPE AUTOFOCUSING DEVICE

[75] Inventor: Minoru Ishiguro, Ohmiya, Japan

[73] Assignee: Fuji Photo Optical Co., Ltd., Ohmiya, Japan

[21] Appl. No.: 958,665

[22] Filed: Oct. 8, 1992

Related U.S. Application Data

[63] Continuation-in-part of Ser. No. 834,636, Feb. 12, 1992.

[30] Foreign Application Priority Data

Oct. 15, 1991 [JP] Japan .................................. 3-295205
Oct. 15, 1991 [JP] Japan .................................. 3-295206
Oct. 15, 1991 [JP] Japan .................................. 3-295207

[51] Int. Cl.⁵ .................. G03B 13/36; G01C 3/08; H01J 40/14
[52] U.S. Cl. ................................ 354/402; 356/4; 250/201.6
[58] Field of Search .............. 354/402, 403, 406, 407, 354/408; 250/201.6; 356/1, 4

[56] References Cited

U.S. PATENT DOCUMENTS

| | | | |
|---|---|---|---|
| 4,373,791 | 12/1983 | Araki | 354/406 |
| 4,387,975 | 6/1983 | Araki | 354/408 |
| 4,575,626 | 3/1986 | Oinoue et al. | 354/407 X |
| 4,616,264 | 10/1986 | Pshtissky | 354/407 X |
| 5,070,353 | 12/1991 | Komiya et al. | 354/402 |
| 5,189,461 | 2/1993 | Ishiguro | 354/402 |

OTHER PUBLICATIONS

U.S. patent application Ser. No. 07/834,636, filed Feb. 12, 1992 entitled Range Finder For Passive Type Autofocussing Device.

*Primary Examiner*—W. B. Perkey
*Attorney, Agent, or Firm*—Price, Heneveld, Cooper, DeWitt & Litton

[57] ABSTRACT

A range finder circuit for a passive-type autofocusing device includes three line photosensors. Secondary differences of their output signals and zero-cross points of these secondary differences are computed and detected so long as these zero-cross points are those appearing when primary differences derived from computation of the secondary differences have absolute values larger than a predetermined value. The range to the scene is computed based on the amount of shifting of these signals into coincidence so that substantially no erroneous range finding occurs even when two objects composing the scene overlap each other. In a preferred embodiment also, signals from pixels of each photosensor are smoothed so that no erroneous range finding occurs even when the scene has on the surface thereof a fine repetitive pattern. The range finder circuit also responds to the output signals of the sensors to initiate write-in of zero-cross point data into associated zero-cross memory circuits which can be electrically position-adjusted so that the range to the scene can be computed substantially without error even when there is a certain error involved in mounting of the photosensors.

14 Claims, 26 Drawing Sheets

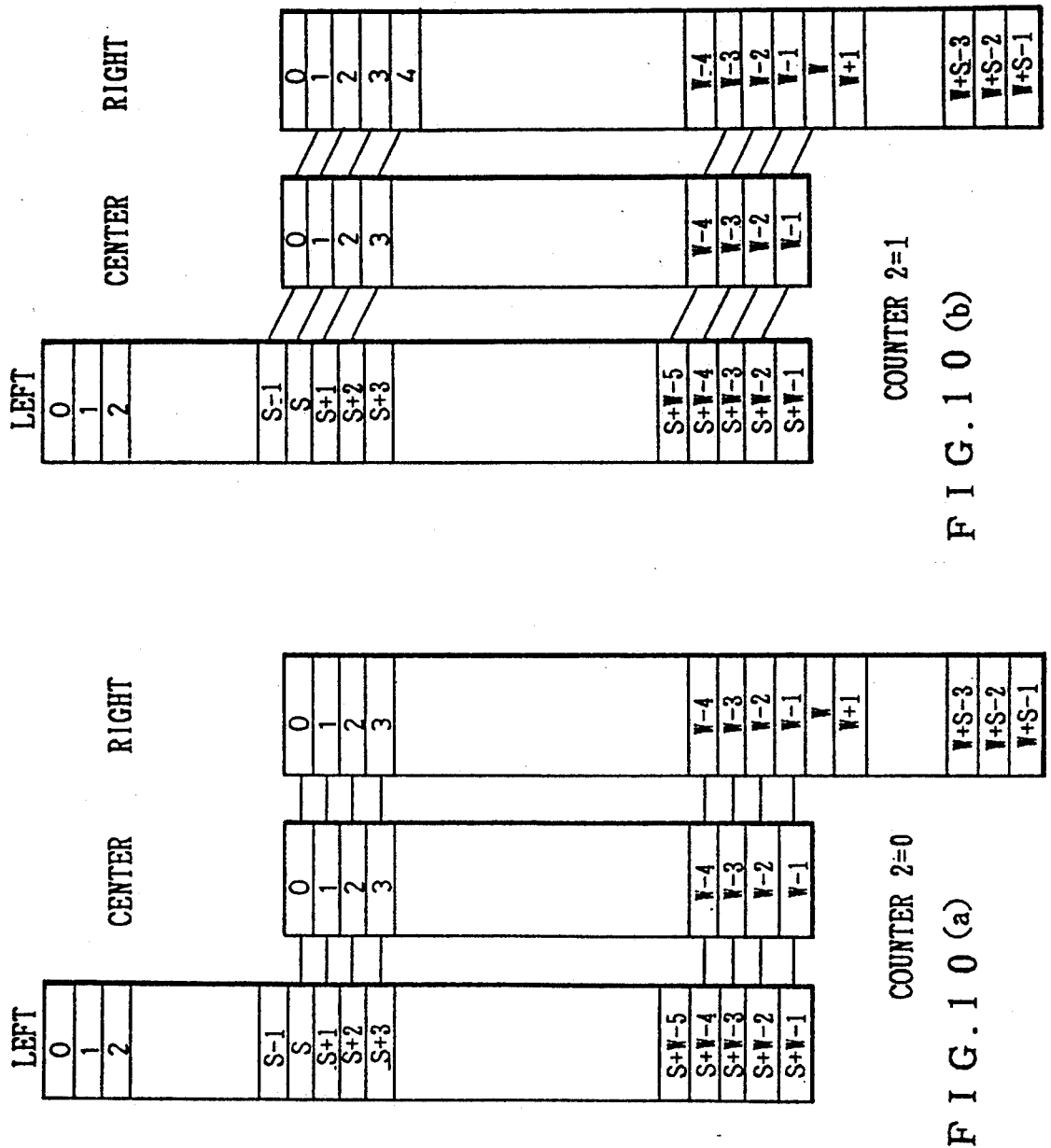
FIG. 10 (b) COUNTER 2=1
FIG. 10 (a) COUNTER 2=0

RANGE FINDER FOR PASSIVE-TYPE AUTOFOCUSING DEVICE

CROSS REFERENCE TO RELATED APPLICATIONS

This is a continuation-in-part of U.S. patent application Ser. No. 07/834,636, filed Feb. 12, 1992, and entitled RANGE FINDER FOR PASSIVE TYPE AUTOFOCUSSING DEVICE, the disclosure of which is incorporated herein by reference.

BACKGROUND OF THE INVENTION

1. Technical Field

This invention relates to a range finder for a passive-type autofocusing device so arranged that light rays emitted from a scene to be photographed are picked up to find a range to the scene and the objective is adjustably brought into focus based on the result of the range finding.

2. Prior Art

The autofocusing device is used to find a shooting range for photographic camera or the like in automatic mode and to bring the objective into focus based on a result of the range finding and such autofocusing device allows everyone to enjoy photographing easily. Various types of autofocusing devices have already been developed and most of them employ the trigonometrical range finding method. A typical autofocusing device relying on this trigonometrical range finding method is a so-called passive-type autofocusing device adapted to pick up light rays emitted from the scene by photosensors provided on the camera and thereby to find a shooting range.

Some of the passive-type autofocusing devices include a pair of photosensors. However, if the scene includes two objects being in contrast with each other, such range finder provided with a pair of photosensors disadvantageously indicates two different states of the single scene to be photographed and consequently cannot achieve reliable range finding, necessarily resulting in a picture which is out of focus.

To assure a reliable range finding and thereby to obtain a well-focused picture, the applicant of this application has previously proposed a range finding mechanism comprising three photodetector arrays (Japanese Patent Application No. 1989-177382, Japanese Patent Application Disclosure No. 1991-42642). A principle of range finding by this range finding mechanism will be described in reference with FIGS. 28 and 29 of the attached drawing. The range finding mechanism comprises a reference photosensor 1, a first photosensor 2 and a second photosensor 3. These photosensors 1, 2, 3 comprise, in turn, imaging lenses 1a, 2a, 3a and photodetector arrays 1b, 2b, 3b, respectively, so that a scene to be photographed is imaged through the imaging lenses 1a, 2a, 3a on the photodetector arrays 1b, 2b, 3b, respectively. FIG. 28 illustrates a case in which the scene P comprises a single object. Now, referring to FIG. 28, $x_0$ represents a displacement of an output signal $P_0$ relating to a luminance distribution on the object P detected by the reference photodetector array 1b with respect to an optical axis $T_0$ of the reference photosensor 1, $x_1$ represents a displacement of an output signal $P_1$ relating to a luminance distribution on the object P detected by the first photodetector array 2b with respect to an optical axis $T_1$ of the first photosensor 2, and $x_2$ represents a displacement of an output signal $P_2$ relating to a luminance distribution on the object P detected by the second photodetector array 3b with respect to an optical axis $T_2$ of the second photosensor 3. These displacements $x_0$, $x_1$, $x_2$ represents phase differences relating to the luminance distribution on the object detected by the photodetector arrays 1b, 2b, 3b, respectively. Assume that the optical axes $T_0$, $T_1$, $T_2$ are spaced from one another by distance B, photodetective surfaces of the photodetector arrays 1b, 2b, 3b are spaced from the respective imaging lenses 1a, 2a, 3a by distance A, and the object P lies at a distance Lp from the imaging lenses 1a, 2a, 3a and at a distance X from the optical axis $T_0$, the following equation is derived from the principle of trigonometrical survey:

$$X = x_0 \cdot Lp / A \quad (1)$$

If a direction in which the output signal image appears with respect to the optical axis $T_0$ is taken into account, $$-x_1 = (B - X)/Lp \cdot A \quad (2)$$

$$x_2 = (B + X)/Lp \cdot A \quad (3)$$

If the equation (1) is substituted for these equations (2), (3), respectively, $$x_1 = (B/Lp) \cdot A + x_0 \quad (4)$$

$$x_2 = (B/Lp) \cdot A + x_0 \quad (5)$$

Comparison of the equations (4) and (5) indicates that $x_1$ and $x_2$ are displaced with respect to a reference $x_0$, respectively, by an amount $$(B/Lp) \cdot A = Xp \quad (6)$$

Accordingly, this Xp may be obtained to compute $$Lp = A \cdot B / Xp \quad (7)$$

The procedure used to obtain the Xp will be explained in reference with FIG. 29. FIG. 29(a) illustrates output signals relating to the luminance distribution detected by the photodetector arrays 1b, 2b, 3b exposed to light rays emitted from two objects with respect to reference output signals $P_0$, $Q_0$. From the state of (a), the output signal waveforms $P_1$, $P_2$ may be shifted with respect to the output waveform $P_0$ until these output signal waveforms $P_0$, $P_1$, $P_2$ coincide with one another to obtain an amount of the displacement Xp. More specifically, at this moment of coincidence, $P_1$ and $P_2$ have been displaced by an equal amount. Accordingly, when the three output signal waveforms coincide with one another after the output signal of the photodetector array 2b and the output signal of the photodetector array 3b have been shifted by an equal amount as seen in FIG. 29(b), the waveforms of these three output signals will provide the data relating to the same object P. Next, as illustrated by FIG. 29 (c), the output signal $Q_1$, $Q_2$ may be shifted with respect to the output signal $Q_0$ until the output signal $Q_1$, $Q_2$ coincide with the output signal $Q_0$ to obtain an amount of the displacement Xq.

Based on the Xp, Xq obtained in the manner as has been described above, the ranges Lp, Lq to the objects P, Q, respectively, are computed according to the equation (7).

SUMMARY OF THE INVENTION

However, the above-mentioned range finding procedure of prior art principally comprises steps of computing a correlation between the output signal of the reference photodetector array 1b and the output signal of the first photodetector array 2b, then computing a correlation between the output signal of the reference photodetector array 1b and the output signal of the second photodetector array 3b and finally detecting a coincidence of the output signal waveforms of the reference photodetector array 1b, the first photodetector array 2b and the second photodetector array 3b. As will be readily understood, such repeated computation of correlations necessary prolongs the signal processing time. As a consequence, the time taken for range finding becomes inconveniently longer and a dynamic object might be photographed out of focus, resulting in a blurred picture.

Depending on a relative position of two objects included in the same scene to be photographed, these two objects may be imaged on any one of the photosensors 1, 2 and 3 in a mutually overlapping state and the range finding data obtained from the output signal generated in such a state can not be divided into two sets of data relating to the respective objects. In such a case, it will be difficult to obtain accurate range finding data.

For the scene having a fine uniformly respective pattern or the like on the surface thereof, output signals from the photosensors 1, 2, 3 respectively representing a luminance distribution on the scene will exhibit uniformly respective waveforms which may sometimes be brought into coincidence with one or more wave shifts, disadvantageously resulting in that these output signals may be erroneously detected to be truly coincident with one another. Such erroneous detection necessarily causes an erroneous range finding.

Additionally, installation of the photosensors 1, 2, 3 in the range finder may be accompanied with a certain installation error depending on the individual range finders and, therefore, with a deviation in the optical system for range finding. Such case is illustrated by FIG. 27. When the imaging lens 1a associated with the photosensor 1 is installed at a position indicated by broken line deviating from its normal position indicated by solid line, an optical axis $T_0$ of the imaging lens 1a will correspondingly deviate from the normal optical axis and the imaging position on the photodetector array 1b will also deviate from the normal position. Also when the imaging lens 1a is installed at the normal position but the photodetector array 1b is installed at a position deviating from its normal position, the imaging position on the photodetector array 1b will deviate from the normal position. Accordingly, the output signals associated with an extent D on the photodetector array 1b may be processed so long as the installation has been properly made, but the installation with a deviation might result in an erroneous range finding unless the output signal processing is performed in association with an extent d instead of the extent D on the photodetector array 1b. Furthermore, degree of such deviation occurring in installing the imaging lens 1a will depend on the individual range finders and therefore it is impossible to compensate such deviation uniformly for all the range finders.

In view of these problems as have been mentioned above, it is a first object of the invention to provide an improved range finder equipped with three photosensors, which allows signal processing to be rapidly performed and range finding data as accurate as possible to be obtained even when two objects included in a scene to be photographed are imaged in mutually overlapping state so that an optically focused picture as sharp as possible to be obtained.

It is a second object of the invention to provide a range finder so improved that an erroneous range finding due to a respective pattern on the scene can be substantially avoided.

It is a third object of the invention to provide a range finder so improved that, even when installation of photosensors to pick up a luminance distribution on a scene to be photographed is accompanied with a deviation, output signals from the photosensors can be properly processed and thereby an erroneous range finding can be substantially avoided.

To achieve the first object set forth above, the invention resides in a range finder for a passive type autofocusing device. The range finder comprising three photosensors to pick up a luminance distribution on a scene to be photographed secondary difference computing circuits to compute secondary differences of output signals from the respective photosensors. Zero-cross detecting circuits to detect zero-cross points of output signals from the respective secondary difference computing circuits so far as these zero-cross points are those appearing when primary differences derived from computation of the respective secondary differences have absolute values larger than a predetermined value. Zero-cross memory circuits in which the zero-cross behavior signals obtained by the respective zero-cross detecting circuits are stored, and a coincidence detecting circuit to compare the zero-cross behavior signals stored in the respective zero-cross memory circuits with one another and thereby to detect a coincidence of these zero-cross behavior signals. One of three photosensors is selected as a reference photosensor and the zero-cross behavior signals obtained from the other two photosensors are successively shifted relative to the zero-cross behavior signal obtained from the reference photosensor until a coincidence of these zero-cross behavior signals is detected by the coincidence detecting circuit and a range to the scene is computed based on an amount of such shifting.

With such arrangement, photodetector arrays constituting the respective photosensors provide output voltage signals representing the luminance distribution on the scene and secondary difference distributions of the respective output voltage signals behave across the respective zero levels. For the luminance distribution on the same portion of the scene, the zero-cross points of such behaviors associated with three photosensors will be coincident with one another but shifted relative to a given reference portion. Of these zero-cross points, only that appearing when the primary differences derived from the associated secondary differences have absolute values larger than a predetermined value will be detected as a true zero-cross point.

An amount of this shift corresponds to an amount by which the coincidence detecting circuit has shifted the zero-cross behavior signal waveforms until a coincidence thereof is detected.

Based on this amount of shift, a range to the scene can be computed according to the principle of trigonometrical survey.

When two objects are imaged in mutually overlapping state, points of flection appear due to the boundary defined by overlapping of these two objects and the secondary difference waveforms behave across the zero levels. However, none of the zero-cross points appearing due to such phenomenon is detected as the true zero-cross point because the zero-cross points of the secondary differences are detected depending on the absolute values of the respective primary differences.

To achieve the second object set forth above, the invention resides in a range finder for passive type autofocussing device, the range finder comprising three photosensors to pick up a luminance distribution on a scene to be photographed, and a secondary difference computing circuit compute secondary differences of output signals from the respective photosensors. Zero-cross detecting circuits detect zero-cross points of output signals from the respective secondary difference computing circuits. Zero-cross memory circuits store the zero-cross behavior signals obtained by the respective zero-cross detecting circuits. A coincidence detecting circuit to compares the zero-cross behavior signals stored in the respective zero-cross memory circuits to detect a coincidence of these zero-cross behavior signals, wherein each secondary difference computing circuit smoothes output signals from pixels lying within a predetermined continuous extent in each photosensor and computes a difference based on output signals from the pixels lying beyond the predetermined extent which have been subjected to smoothing. One of three photosensors is selected as a reference photosensor and the zero-cross behavior signals obtained from the other two photosensors are successively shifted relative to the zero-cross behavior signal obtained from the reference photosensor until a coincidence of these zero-cross behavior signals is detected by the coincidence detecting circuit and a range to the scene is computed based on an amount of such shifting.

With this arrangement, even when the scene presents a repetitive pattern or the like on the surface thereof, the output signals from the photosensors in association with such repetitive pattern or the like are smoothed so that the output signals representing this pattern may offset one another within the smoothed extent, and the difference computation is performed based on the output signals from the pixels lying beyond the smoothed extent so that the repetitive pattern or the like may be neglected.

To achieve the third object set forth above, the invention resides in a range finder for a passive type autofocusing device, the range finder comprising three photosensors to pick up a luminance distribution on a scene to be photographed. Secondary difference computing circuits compute secondary differences of output signals from the respective photosensors and, zero-cross detecting circuits to detect zero-cross points of output signals from the respective secondary difference computing circuits. Zero-cross memory circuits store the zero-cross behavior signals obtained by the respective zero-cross detecting circuits are stored, and a coincidence detecting circuit compares the zero-cross behavior signals stored in the respective zero-cross memory circuits with one another and thereby detect a coincidence of these zero-cross behavior. There is provided externally operable adjuster means adapted to position-adjust the pixel in each photosensor providing an output signal which initiates write-in of the zero-cross point data to the associated zero-cross memory circuit, wherein a position at which the write-in to the zero-cross memory circuit starts is adjusted by the adjuster means for each photosensor. One of three photosensors is selected as a reference photosensor and the zero-cross behavior signals obtained from the other two photosensors are successively shifted relative to the zero-cross behavior signal obtained from the reference photosensor until a coincidence of these zero-cross behavior signals is detected by the coincidence detecting circuit and a range to the scene is computed based on an amount of such shifting.

With this arrangement, even when installation of the photosensors in the range finder involves a deviation from the normal position of installation, the position at which the output signal from this photosensor begins to be written into the associated zero-cross memory circuit may be adjusted by the adjuster means to compensate the deviation and thereby to obtain substantially accurate range finding data as if the installation had been properly made.

BRIEF DESCRIPTION OF THE DRAWINGS

FIG. 10 is a diagram illustrating the routine executed in Embodiments 1, 2 and 3.1 to read and compare the data stored in the respective zero-cross memory circuits;

DESCRIPTION OF THE PREFERRED EMBODIMENT

Figure 24:
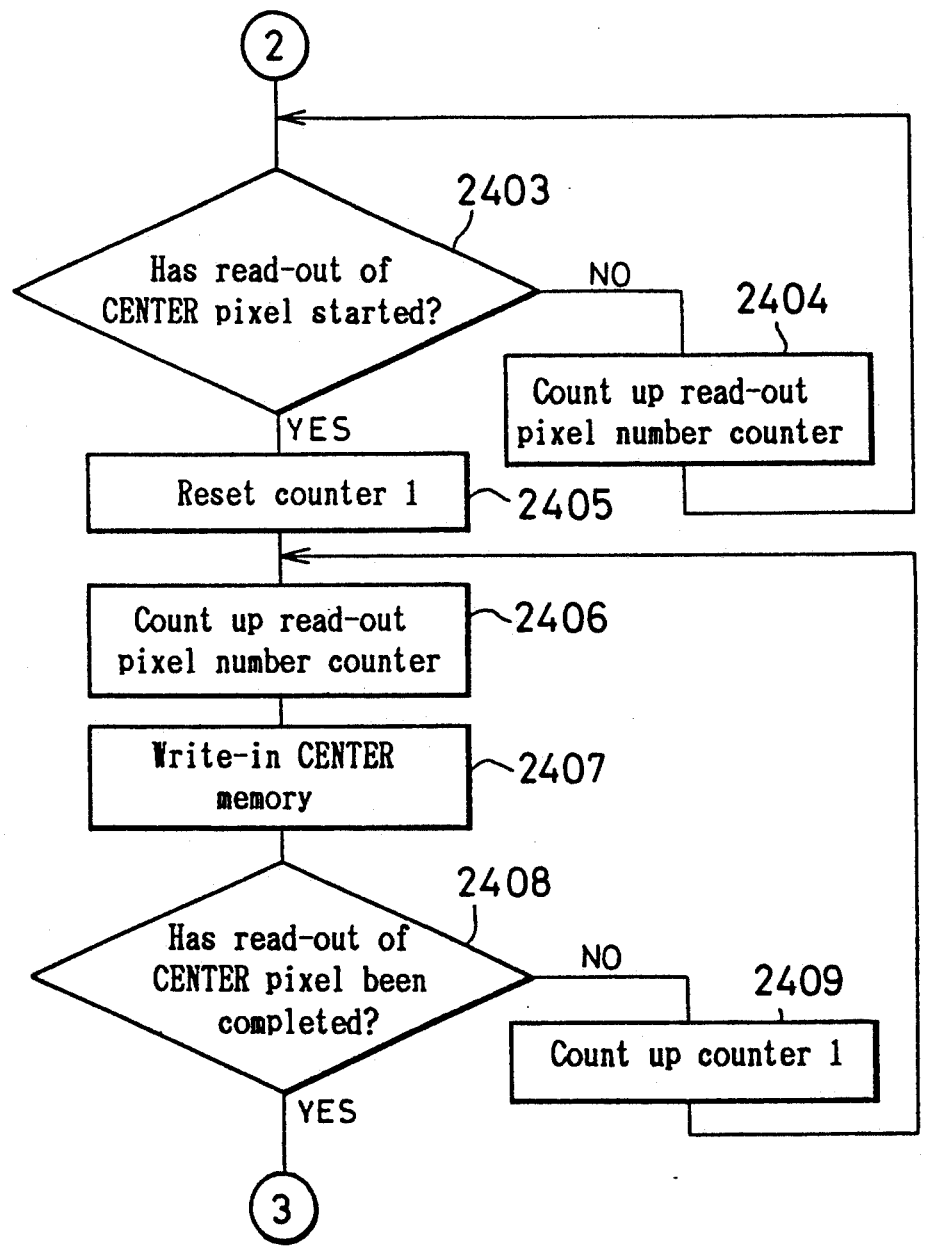
FIG. 24 is a flow chart of the program routine executed in Embodiments 3.2 and 3.3 to write the data obtained from the line sensor, particularly from the central section thereof, into the zero-cross memory circuit.
Figure 25:
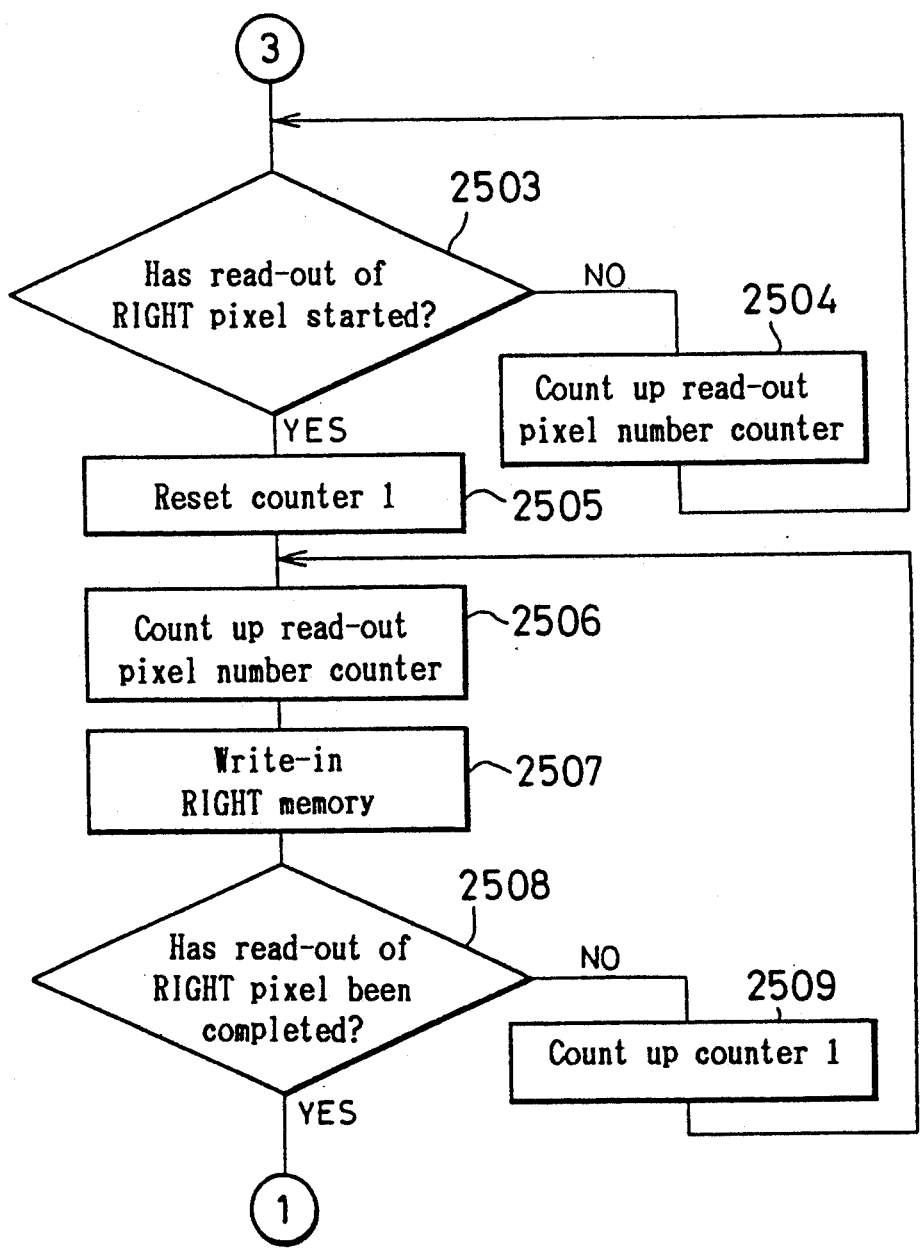
FIG. 25 is a flow chart of the program routine executed in Embodiments 3.2 and 3.3 to write the data obtained from the line sensor, particularly from the right section thereof, into the zero-cross memory circuit.
Figure 26:
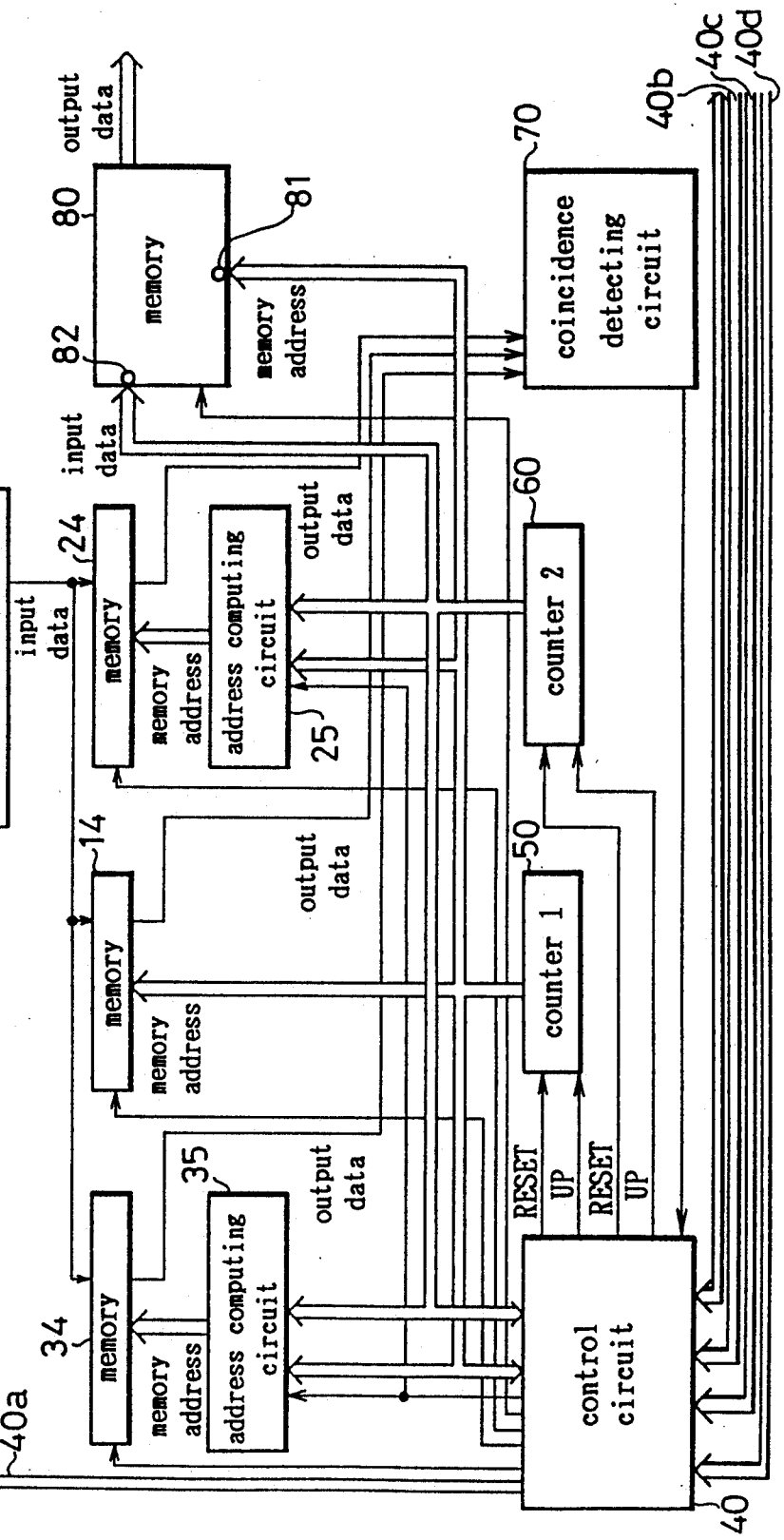
FIG. 26 is a circuit block diagram showing Embodiment 3.3 of the range finder for passive-type autofocusing device constructed in accordance with the invention.
Figure 27:
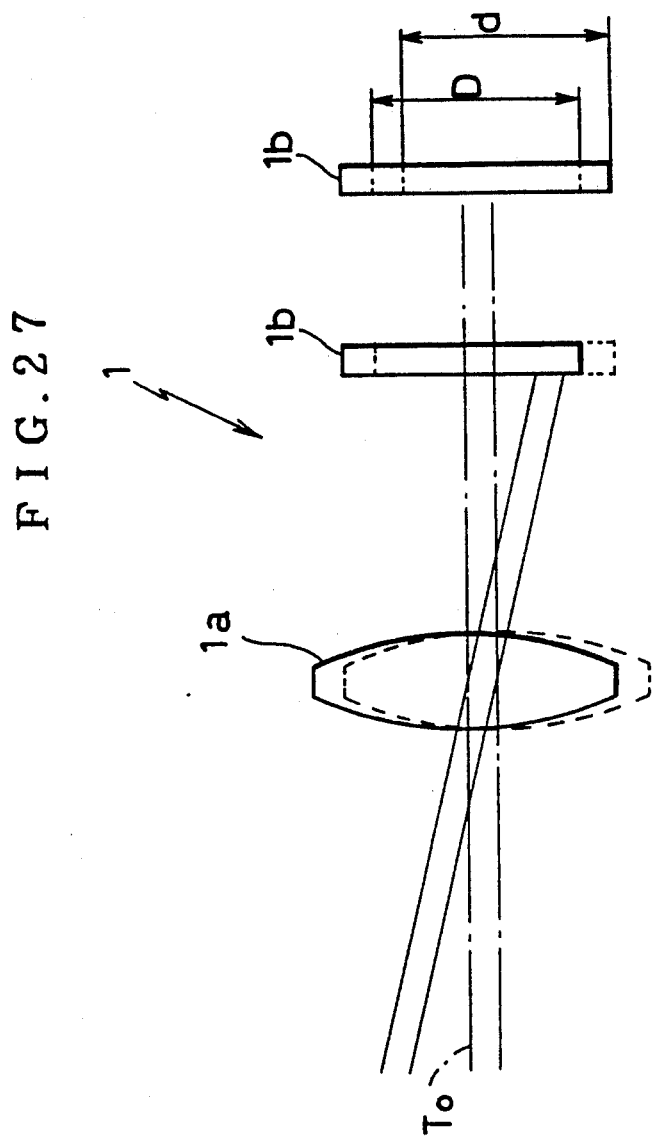
FIG. 27 is a diagram illustrating the installation error of the photosensor.
Figure 28:
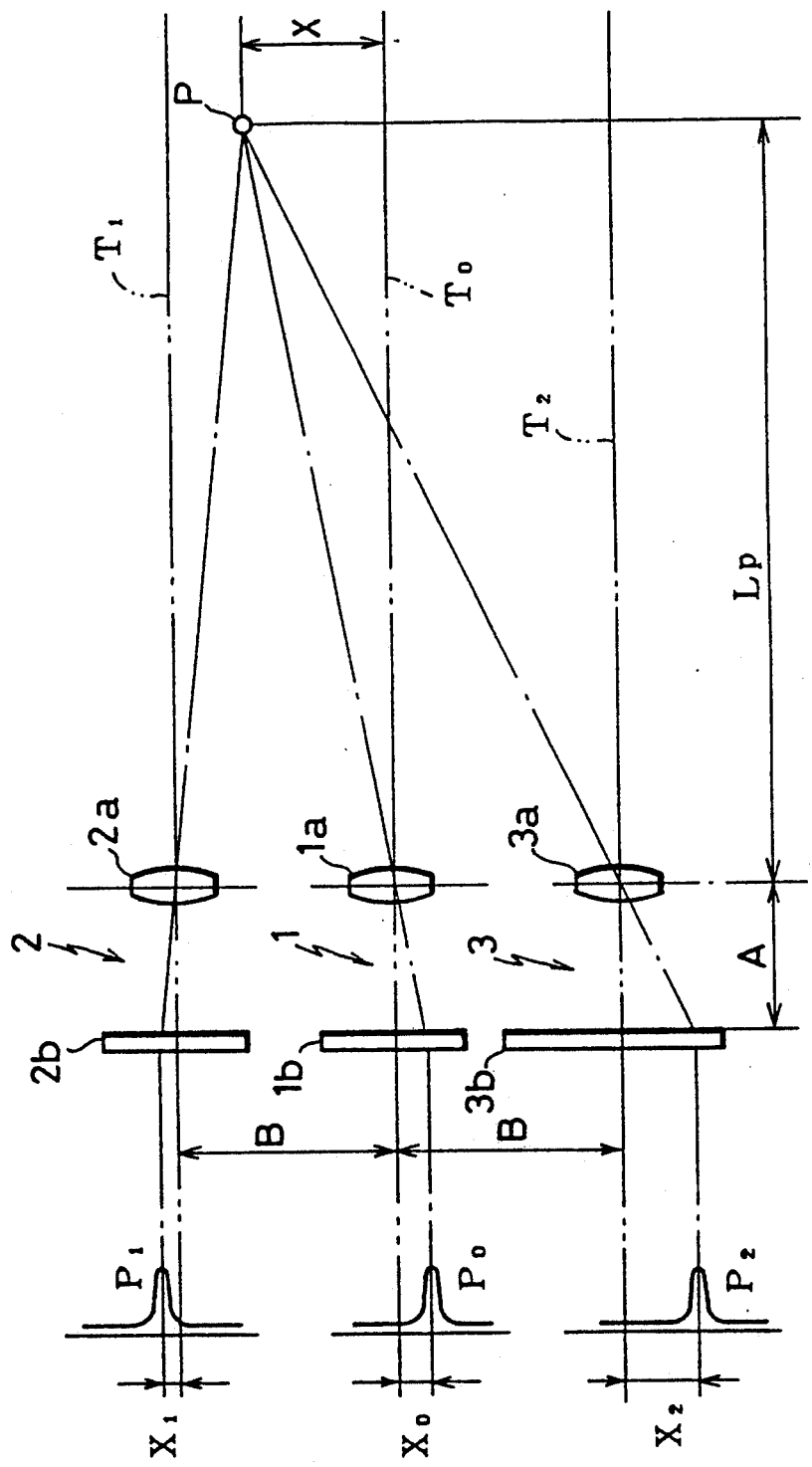
FIG. 28 is an optical path diagram illustrating the principle of range finding.
Figures 29A, 29B, 29C:
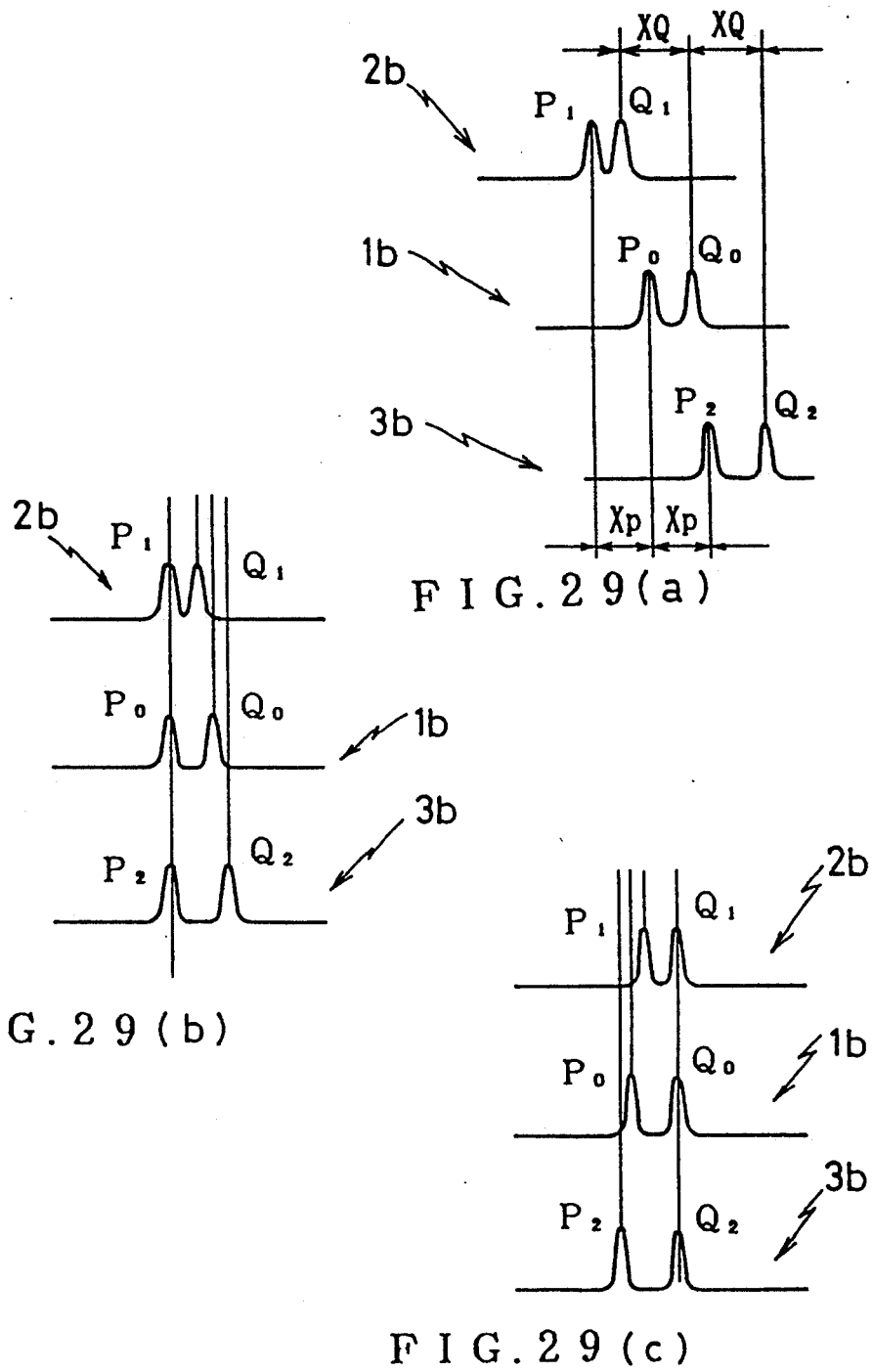
FIG. 29 is a signal diagram illustrating the procedure executed according to the range finding principle and the luminance distribution on the photographed scene detected by the photodetector arrays.

The range finder for autofocusing device of the invention will be described more specifically in reference to the attached drawings. It should be understood that FIGS. 1 through 11 illustrate Embodiment 1; FIGS. 12 through 16 illustrate Embodiment 2; FIGS. 17 through 20 illustrate Embodiment 3.1; FIGS. 21 through 25 illustrate Embodiment 3.2; and FIG. 26 illustrates Embodiment 3.3.

EMBODIMENT 1

Figure 2:
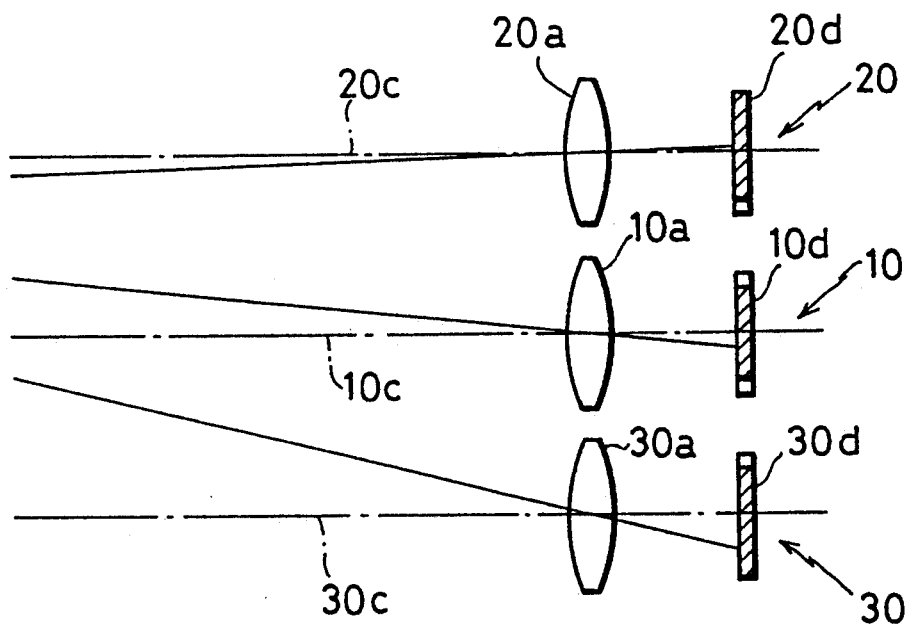
FIG. 2 is a side view schematically showing arrangement of the photosensors used in Embodiments 1, 2 and 3.1.

Photosensors 10, 20 30 comprise line sensors which comprise, in turn, photodetector arrays each including an appropriate number of pixels arranged side by side, and imaging lenses combined with the line sensors. Referring to FIG. 2, there are provided on the front side of the photographic camera three imaging lenses 10a, 20a, 30a so that light rays emitted from a scene to be photographed pass through these imaging lenses 10a, 20a, 30a and the scene is imaged on respective line sensors 10b, 20b, 30b placed behind the associated imaging lenses. These photosensors 10, 20, 30 are referred to here as the central sensor 10, the right side sensor 20 and the left side sensor 30 with optical axes 20c, 30c of the right side sensor 20 and the left side sensor 30, respectively, being arranged symmetrically with respect to an optical axis 10c of the central sensor 10. The line sensors 10b, 20b, 30b are referred to here as the central line sensor 10b, the right side line sensor 20b and the left side line sensor 30b.

Figure 1:
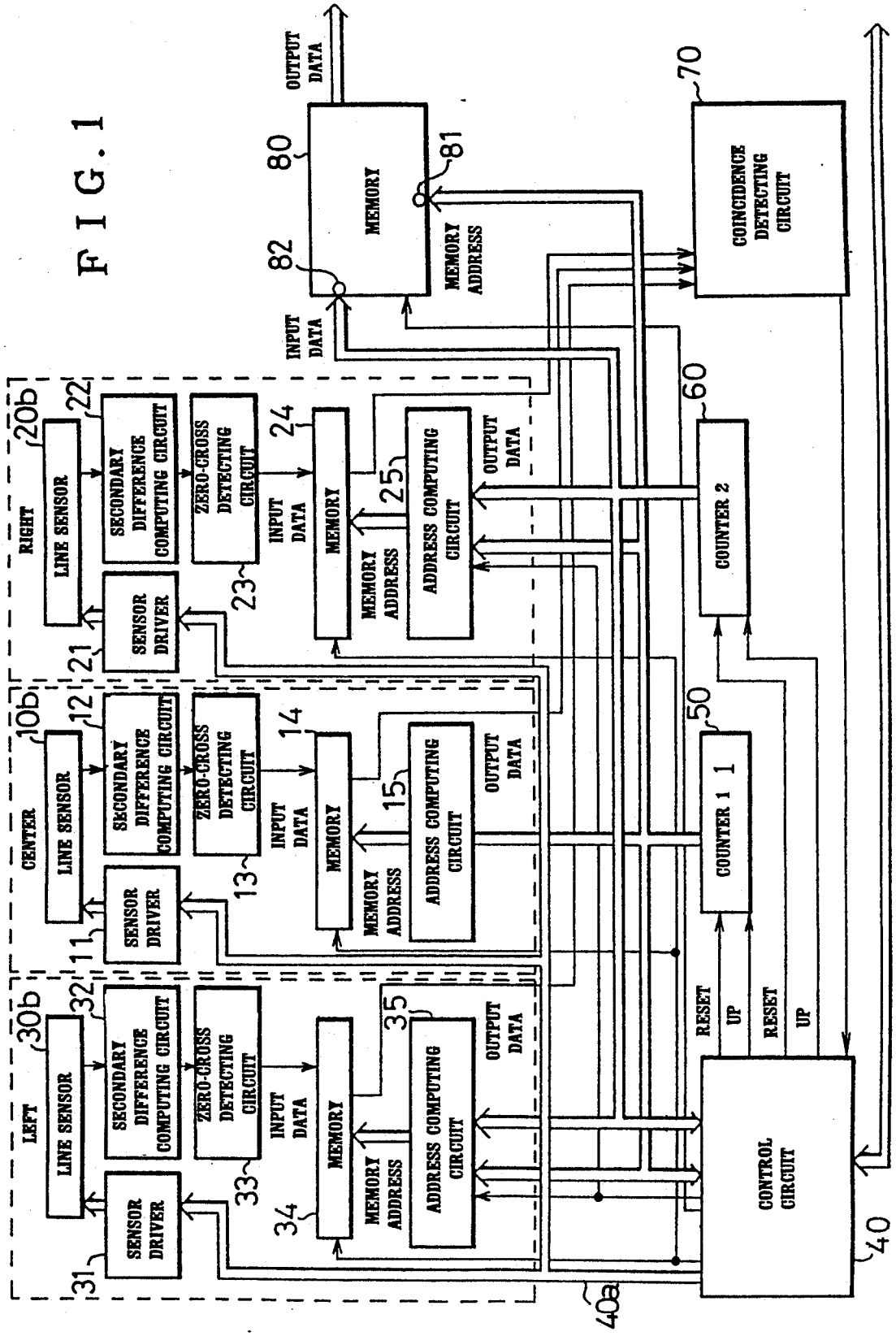
FIG. 1 is a circuit block diagram showing Embodiments 1 and 2 of the range finder for a passive-type autofocusing device constructed in accordance with the invention.

The line sensors 10b, 20b, 30b are separately applied, as illustrated in FIG. 1, with drive signals from respective sensor drivers 11, 21, 31 and begin to pick up the light rays coming from the sensor on the basis of the drive signals. The sensor drivers 11, 21, 31 are connected to a control circuit 40 via a drive control signal link 40a and controlled by a drive control signal output from the control circuit 40.

As will be apparent from FIG. 1, secondary difference computing circuits 12, 22, 32 are connected to output terminals of the line sensors 10b, 20b, 30b, respectively, and the secondary difference computing circuits 12, 22, 32 compute secondary differences of the luminance distribution signals on the scene which have been obtained by the respective line sensors 10b, 20b, 30b.

Figure 3:
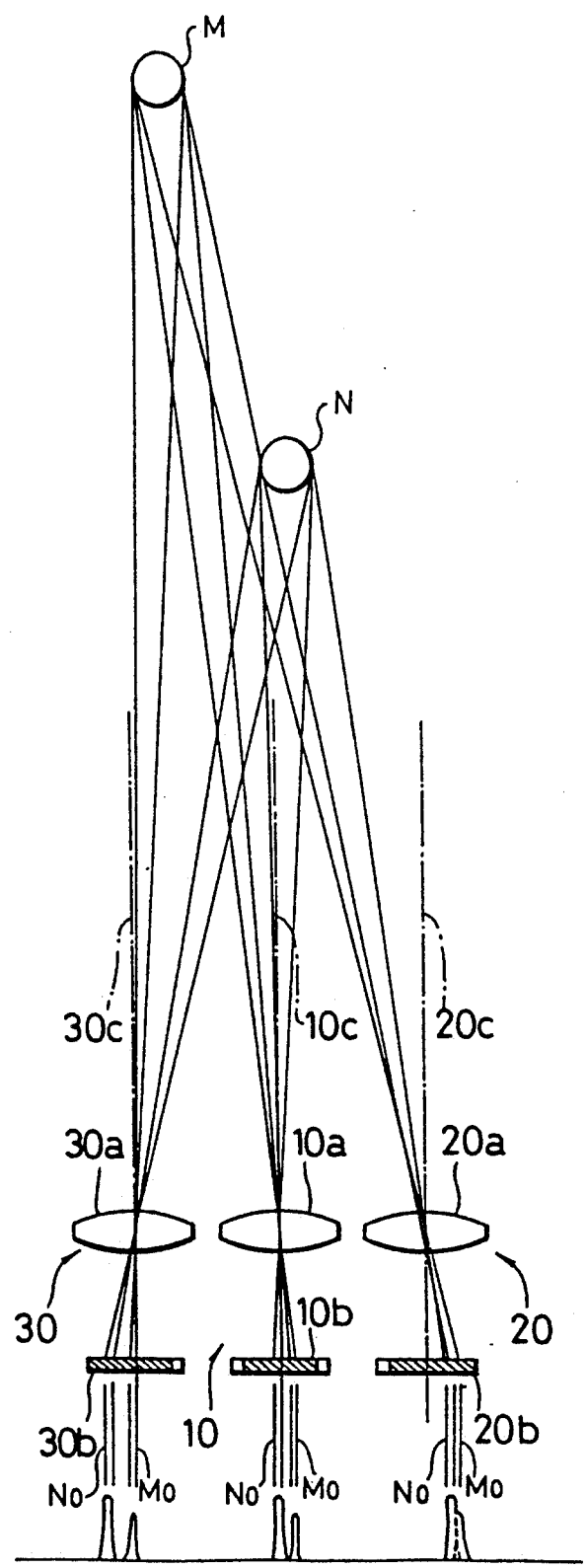
FIG. 3 is a diagram illustrating a state in which two objects included in a same scene to be photographed are simultaneously imaged on a same line sensor.
Figure 4:
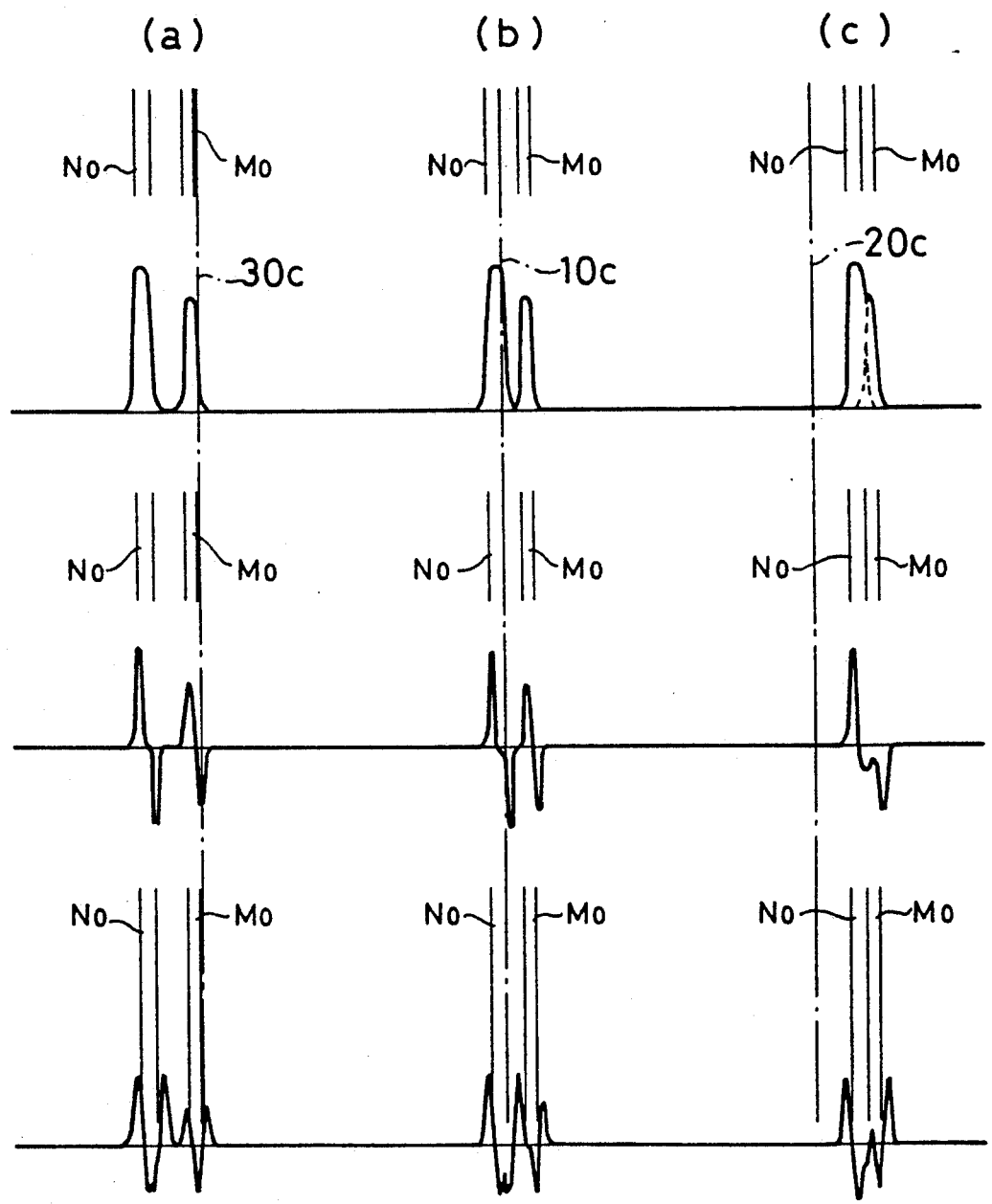
FIG. 4 is a waveform diagram illustrating the luminance distribution on two objects being imaged in mutually overlapping state as well as the corresponding primary and secondary difference signal waveforms generated on the assumption that no selection of zero-cross point occurs.

In the case as illustrated by FIG. 3, the scene to be photographed comprises two objects M, N and these objects M, N are imaged in overlapped relationship in the photosensor 20. Specifically, these objects M, N are imaged on the respective line sensors 10b, 20b, 30b. Referring to FIG. 4, these objects M, N designated here by $M_O$, $N_O$, respectively are imaged (a) on the left side line sensor 30b, (b) on the central line sensor 10b and (c) on the right side line sensor 20b, respectively. In FIG. 4(a), (b) and (c), the top row shows output signal waveforms associated with the object images detected by the corresponding line sensors 10b, 20b, 30b; middle row shows respective primary differences obtained from these output waveforms; and bottom row shows respective secondary differences obtained from these primary differences. As will be apparent from the bottom row in FIG. 4, in the left side line sensor 30b as well as the central line sensor 10b, the primary difference waveform depending on the object images $M_O$, $N_O$ has four peaks and the secondary difference waveform has four zero-cross points. In the right side line sensor 20b, the primary difference waveform has two peaks but the secondary difference waveform has four zero-cross points. More specifically, the objects M, N are imaged, so far as the right side line sensor 20b is concerned, in overlapped relationship as illustrated in the top row of FIG. 4(c) and therefore the primary difference obtained from the output signal of this overlapped images presents points of inflection corresponding to a boundary of these two objects M, N, as seen in the middle row of FIG. 4(c). Thus, the secondary difference waveform includes the zero-cross points.

It will be inconvenient that the secondary difference waveform has two zero-cross points on the portion corresponding to the area over which the object images $M_O$, $N_O$ overlap each other and, accordingly, it is important to detect the zero-point appearing when the primary difference has an absolute value larger than a predetermined value.

Figure 5:
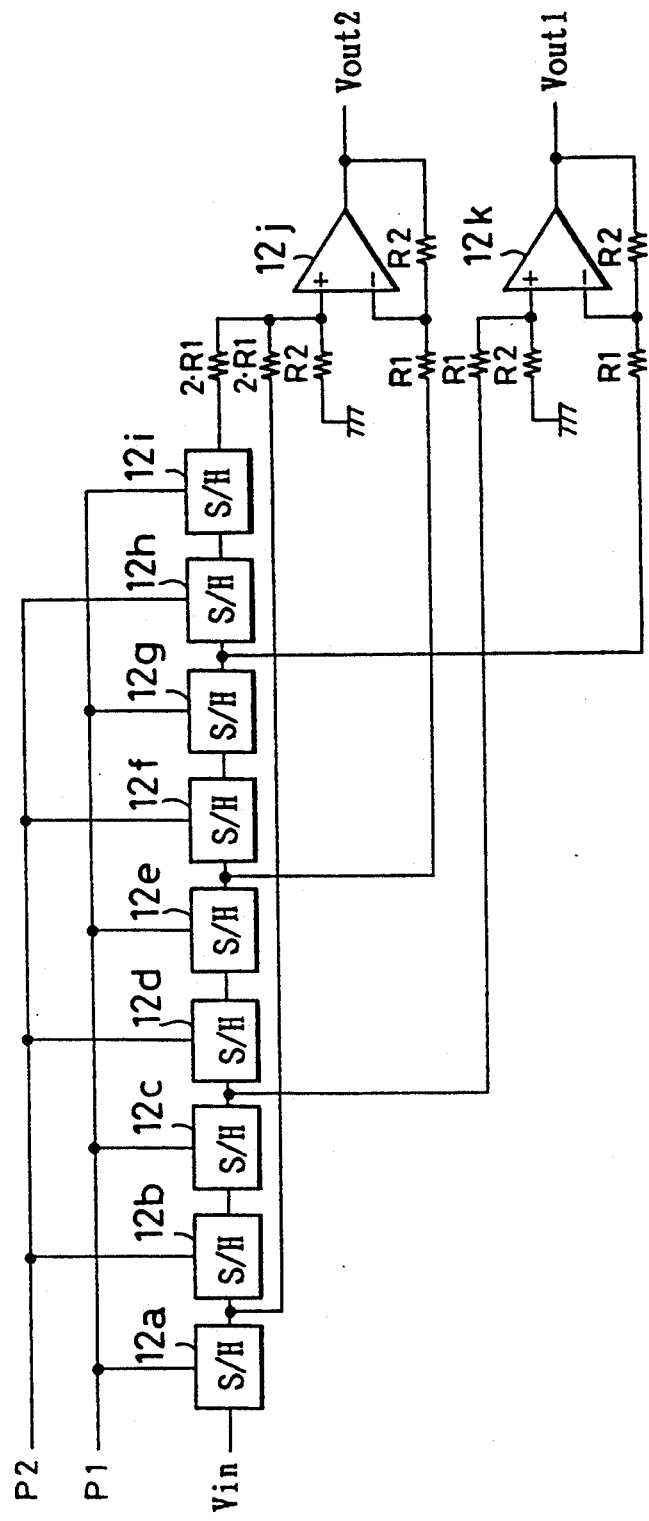
FIG. 5 is a schematic circuit diagram of the secondary difference computing circuit used in Embodiment 1 to compute primary and secondary differences from outputs of each line sensor.

Secondary difference computing circuits 12, 22, 32 suitable for detection of the zero-cross appearing when the primary difference has an absolute value larger than the predetermined value are shown by FIG. 5. These secondary difference computing circuits 12, 22, 32 utilize sample hold circuits 12a, 12b, 12c, 12d, 12e, 12f, 12g, 12h and 12i to shift and sample successively output signals Vin from the respective pixels of the line sensors 10b, 20b, 30b, and utilize an operational amplifier 12j and resistors of appropriate resistance values to compute $$Vout2 = (R2/(2*R1)) \\ *(Vin(n) - 2*Vin(n-2) + Vin(n-4)) \quad (8)$$

and thereby to determine the secondary difference. Then, an operational amplifier 12k is utilized to compute $$Vout1 = (R2/R1)*(Vin(n-1) - Vin(n-3)) \quad (9)$$

and thereby to determine the primary difference.

As illustrated in FIG. 1, output signals of the secondary difference computing circuits 12, 22, 32 are applied to zero-cross detecting circuits 13, 23, 33, respectively, which detect then zero-cross points of the respective secondary difference obtained by the secondary difference computing circuits 12, 22, 32.

Figure 6:
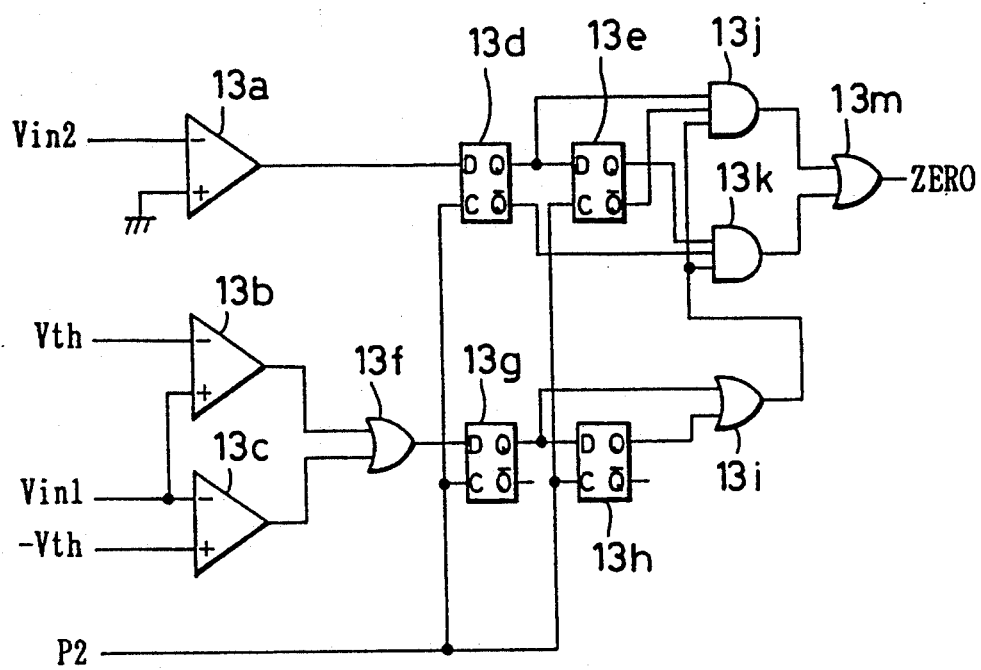
FIG. 6 is a schematic circuit diagram of the zero-cross detecting circuit used in Embodiment 1 to detect a zero-cross point from the secondary difference signal computed by the secondary difference computing circuit.

As will be seen in FIG. 6, a secondary difference output signal Vin2 from the secondary difference computing circuit 12 (22, 32) is applied to an input terminal of a comparator 13a as a component of the zero-cross detecting circuit 13 (23, 33) and a reference terminal of this comparator 13a is grounded. A primary difference output signal Vin1 from the secondary difference computing circuit 12 (22, 32) is applied to +input terminal of a comparator 13b and −input terminal of a comparator 13c while +Vth and −Vth (relational reference voltage) are applied to −input terminal of the comparator 13b and +input terminal of the comparator 13c, respectively. Output of the comparator 13a is applied to D terminal of a D flip-flop 13d and Q output of this D flip-flop 13d is applied to D terminal of a D flip-flop 13e.

Output of the comparators 13b, 13c are applied to an OR circuit 13f, output of this OR circuit 13f is applied to D terminal of a D flip-flop 13g and output of this D flip-flop 13g is applied to D terminal of a D flip-flop 13h. Respective Q outputs of the D flip-flop 13g and the D flip-flop 13h are applied to an OR circuit 13i.

Q output of the D flip-flop 13d and $\overline{Q}$ output of the D flip-flop 13e are applied together with the output of the OR circuit 13i to an AND circuit 13j while $\overline{Q}$ output of the D flip-flop 13d and Q output of the D flip-flop 13e are applied together with output of the OR circuit 13i to an AND circuit 13k. Respective outputs of the AND circuits 13j, 13k are applied to an OR circuit 13m. Clock terminals of the flip-flops 13d, 13e, 13g, 13h are applied with a clock pulse P2.

Figure 7:
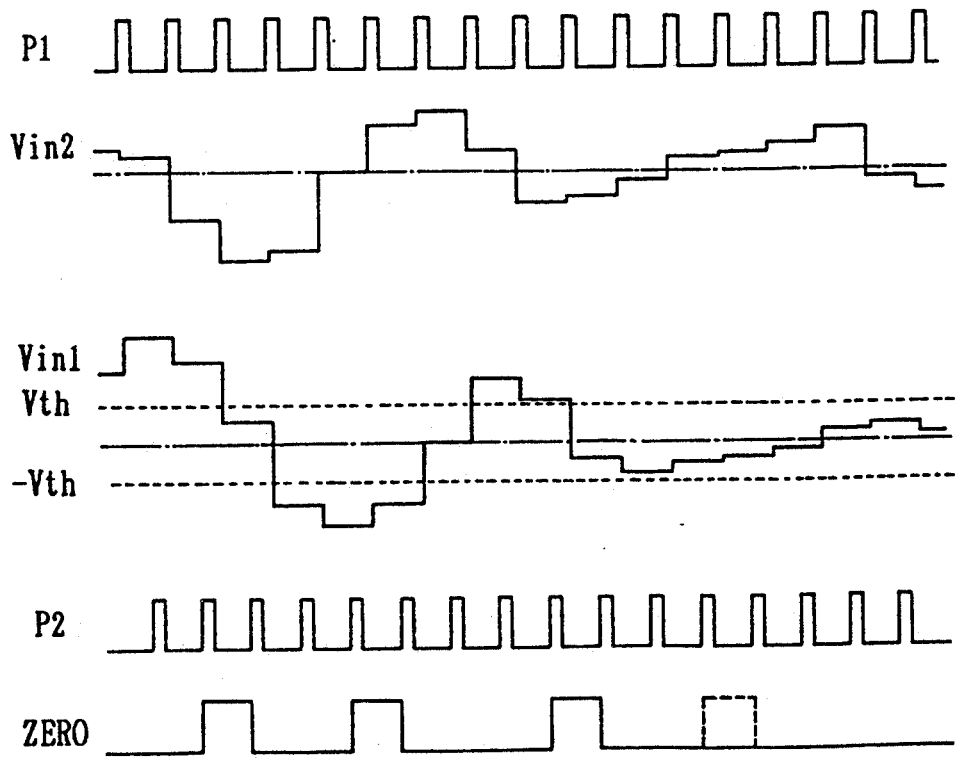
FIG. 7 is a time chart for the circuit of FIG. 6.

Referring to FIG. 7 illustrating the time chart concerning the zero-cross detecting circuit 13 (23, 33), the secondary difference output Vin2 and the primary difference output Vin1 are applied from the secondary difference computing circuit 12 (22, 32) to the zero-cross detecting circuit 13 (23, 33) in synchronization with a clock pulse P1. If an absolute value of the primary difference output Vin1 is larger than the absolute value of the reference values +Vth, −Vth and the secondary difference output Vin2 crosses the zero level, a zero-cross signal in the form of ZERO pulse is output from the OR circuit 13m synchronously with the clock pulse P2. More specifically, assumed that the zero-cross signal is output regardless of a value the primary difference output Vin1 takes, so long as the secondary difference output Vin2 zero-crosses, a portion of the ZERO pulse output waveform indicated by broken lines in FIG. 7 would be output. However, the signal corresponding to the portion indicated by the broken lines is never output because the value of the primary difference output is always monitored so as to exclude such occurrence. Accordingly, for the boundary area over which two or more objects are overlapped, no zero-cross signal is output.

Zero-cross behavior signal waveforms obtained by the zero-cross detecting circuits 13, 23, 33 are applied to zero-cross memory circuits 14, 24, 34 and stored therein, respectively. These zero-cross behaviors are then stored at addresses which are output from respective address computing circuits 15, 25, 35 according to the pixel locations in the respective line sensors 10b, 20b, 30b. More specifically, counter signals (COUNTER 1) are applied from a first counter 50 to the address computing circuits 15, 25, 35 for successive increments and the zero-cross behavior signal waveforms are stored at the respective addresses corresponding to the respective pixels in accordance with the following equations:

$$ADDRESS = COUNTER\ 1 - S \quad (10)$$

for the central memory circuit 14, $$ADDRESS = COUNTER\ 1 - S \quad (11)$$

for the right side memory circuit 24, $$ADDRESS = COUNTER\ 1 \quad (12)$$

for the left side memory circuit 34. In the equations (10) and (11), S represents a constant.

Count signals (COUNTER 2) from a second counter 60 are applied to the address computing circuits 25, 35. Count up and reset of the second counter 60 and the first counter 50 are under control of output signal from the control circuit 40. The second counter 60 increments the address for every read-out of data from the zero-cross memory circuits 24, 34, as will be described later. The address computing circuits 15, 25, 35 are also supplied from the control circuit 40 with address processing information on the basis of which the address computing circuits 15, 25, 35 output predetermined write/read signals into and from the zero-cross memory circuits 14, 24, 34.

Output sides of the zero-cross memory circuits 14, 24, 34, are connected to a coincidence detecting circuit 70 of which the output side is, in turn, connected to the control circuit 40.

The count signal from the first counter 50 is applied to an address port 81 of a data memory circuit 80 while the count signal from the second counter 60 is applied to a range data pot 82 of the data memory circuit 80. Both the count signals from the first counter 50 and the second counter 60 are also applied to the control circuit 40. The control circuit 40 supplies the data memory circuit 80 with a data memory signal on the basis of which the address data and the range data are stored in the data memory circuit 80.

Now referring to FIGS. 8 and 9, a routine to write and read the luminance information memory for a scene to be photographed will be described.

Upon start of range finding, charge accumulation occurs on the respective line sensors 10$b$, 20$b$, 30$b$ (step 801), then the second counter 60 is reset (step 802) and the first counter 50 also is reset (step 803). Data corresponding to a single pixel in each line sensor 10$b$, 20$b$, 30$b$ is read out (step 804), the data thus read out are written into the respective zero-cross memory circuits 14, 24, 34 (step 805). It should be understood here that zero-cross detection is executed between the step 804 and the step 805. Next, the routine proceeds to a step 806 to determine whether read-out concerning all the pixels has been completed or not, based on a value of the first counter 50. If not, the routine now proceeds to a step 807 to count up the first counter 50 and then returns to the step 804 to read respective single pixels, followed by written them into the zero-cross memory circuits 14, 24, 34 (step 805). The data written into the zero-cross memory circuits 14, 24, 34 are stored at the addresses assigned by the address computing circuits 15, 25, 35, based on the count signals from the first counter 50. The addresses at which the data are to be stored are assigned according to the above-mentioned equations (10), (11) and (12). It should be understood that, when the addresses are negative, no write-in occurs.

If read-out of the data corresponding to all the pixels has been completed and conclusion of the step 806 is YES, the routine then proceeds to a step 901 (FIG. 9) to reset the first counter 50. Next, data are read out from the zero-cross memory circuits 14, 24, 34 (step 902) and the coincidence detecting circuit 70 determines whether the data from the central zero-cross memory circuit 14, the right side zero-cross memory circuit 24 and the left side zero-cross memory circuit 34 coincide or not (step 903). If the coincidence is detected, the routine proceeds to a step 904 to write a current value of the first counter's count signal (COUNTER 1) as address data and a current value of the second counter's count signal (COUNTER 2) as range data into the data memory circuit 80. If determination of the step 903 is NO, the routine proceeds to a step 905 to determine whether the memory data (reference data) corresponding to all the effective pixels in the central line sensor 10$b$ have been completely read out or not, based on the count value of the first counter 50. If not, the routine proceeds to a step 906 to count up the first counter 50 and thereafter returns to the step 902 to repeat the steps 902 through 905.

After read-out of the reference data has been completed, the routine proceeds from the step 905 to a step 907 to determine whether the data in the right and left side zero-cross memory circuits 24, 34 have been shifted by a specified amount and the above-mentioned steps 901 through 905 have been executed (shift read-out) or not, based on the count value of the second counter 60 (step 907). If the shift read-out has not been completed, the second counter 60 is counted up and thereafter the routine returns to the step 901. Then, the steps 902 through 905 are repeated. After the shift read-out has been completed, the routine proceeds to a step 909.

Read-out of the memory data during these steps 901 through 908 with the help of the address computing circuits 15, 25, 35 which designate the respective address is performed according to the following equations corresponding to the previously mentioned equations (10), (11), (12), respectively:

$$\text{ADDRESS} = \text{COUNTER 1} \qquad (13)$$

for the central zero-cross memory circuit 14, $$\text{ADDRESS} = \text{COUNTER 1} + \text{COUNTER 2} \qquad (14)$$

for the right side zero-cross memory circuit 24, and $$\text{ADDRESS} = \text{COUNTER 1} + S - \text{COUNTER 2} \qquad (15)$$

for the left side zero-cross memory circuit 34. In the equation (15), S represents a constant. A relationship established here between write-in address and read-out address will be explained in reference with FIGS. 10 and 11.

FIG. 10(a) illustrates the case in which the count signal from the second counter 60 is set to 0 (COUNTER = 2). In such case, the data stored at the addresses corresponding to the respective pixels in the line sensors 10$b$, 20$b$, 30$b$ are successively compared one to another with the first counter 50 being successively incremented from 0 to (W − 1) (step 906) and thereby a coincidence of these data is detected. Accordingly, if COUNTER 2 = 0, the address will be incremented from 0 to (W − 1) for the pixels in the central line sensor 10$b$ as well as the right side line sensor 20$b$ and from S to (S + W − 1) for the pixels in the left side line sensor 30$b$. Then, the second counter 60 is incremented (step 908) and, as indicated by FIG. 10(b), the data stored at the addresses corresponding to the respective pixels in the line sensors 10$b$, 20$b$, 30$b$ are compared to one another as the first counter 50 is successively incremented from 0 to (W − 1) (step 906) with the count signal of the second counter 60 being set to 1 (COUNTER 2 = 1) and thereby a coincidence of the data is detected. Accordingly, when COUNTER 2 = 1, the address will be incremented from 0 to (W − 1) for the central line sensor 10$b$, from 1 to W for the right side line sensor 20$b$ and from (S − 1) to (S + W − 2) for the left side line sensor 30$b$. In other words, the memory data in the right side zero-cross memory circuit 24 and the left side zero-cross memory circuit 34 will be subjected to the coincidence detection with a shift of one pixel relative to the memory data in the central zero-cross memory circuit 14.

Figure 11B:
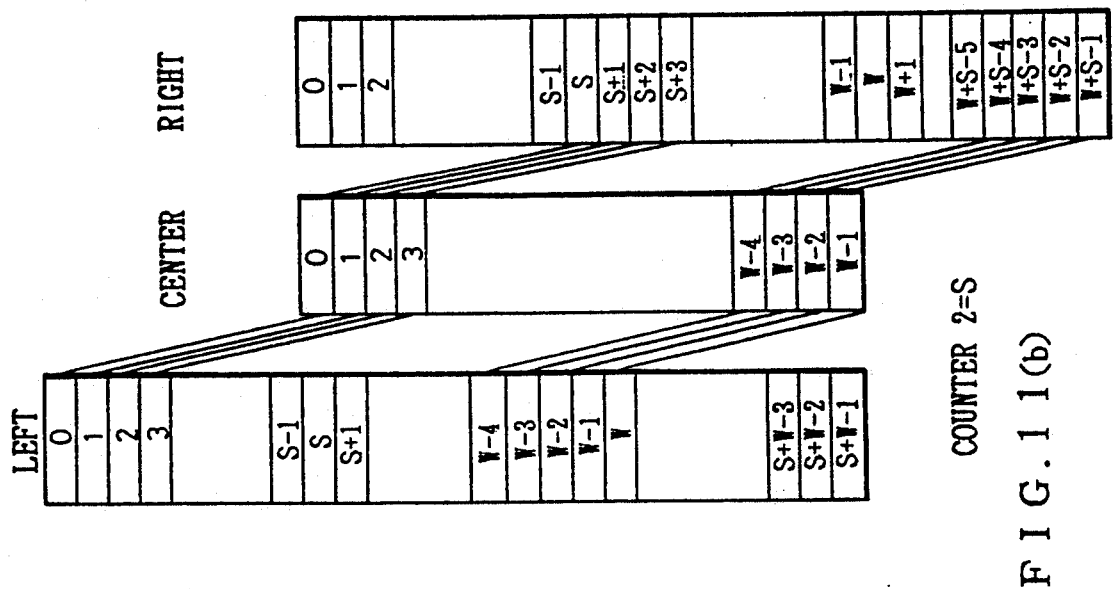
FIG. 11 is a diagram illustrating the alternative routine executed in Embodiments 1, 2 and 3.1 to read and compare the data stored in the respective zero-cross memory circuits.
Figure 11A:
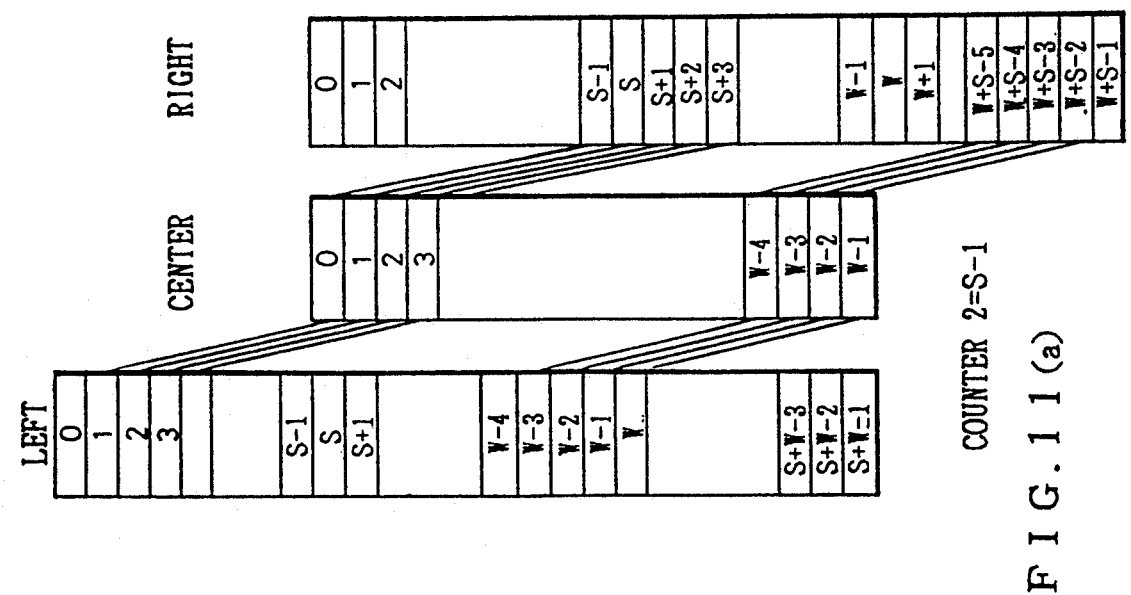

The coincidence detection will be repeated as the second counter 60 is successively incremented (step 908) until the count signal of the second counter 60 reaches COUNTER 2 = S. FIG. 11(a) illustrates the case of COUNTER 2=S−1 and FIG. 11(b) illustrates the case of COUNTER 2=S.

More specifically, the count value of the second counter 60 at the moment when the memory data in the respective zero-cross circuits 14, 24, 34 come in coincidence with one another corresponds to the amount of displacement Xp in the previously mentioned equation (6). At the step 904, this amount of displacement is stored in the data memory circuit 80 as the range data.

If the step 907 determines that read-out of the given shift has been completed, the routine proceeds to a step 909 at which the range data written into the data memory circuit 80 at the step 904 is applied to an objective drive mechanism (not shown) so that the objective may be moved so as to focus the camera on the scene.

According to this embodiment, even when two objects are imaged on the line sensor in the overlapped state, none of the zero-cross points associated with the area over which these two object images is detected because of the unique arrangement that the zero-cross detecting circuit detects only the zero-cross point appearing when the primary difference of the output signal from the associated line sensor has an absolute value larger than a predetermined value. In this way, an accuracy of the range finding data and, therefore, a focusing precision relative to the objects can be improved.

EMBODIMENT 2

Referring to FIGS. 12 through 16, there is shown Embodiment 2 using the secondary difference computing circuit 12 (22, 32) which is of an alternative arrangement with respect to that used in the previously described Embodiment 1.

Figure 12:
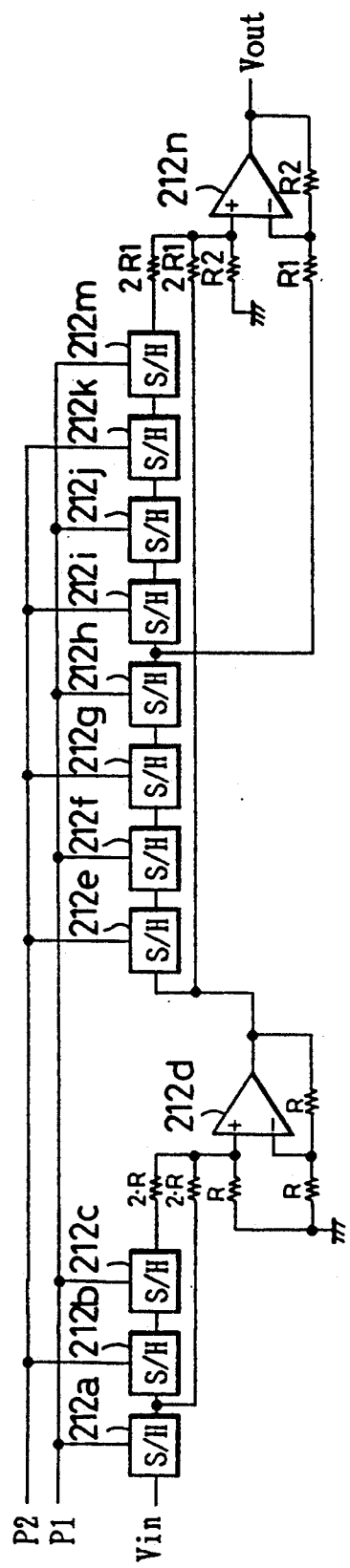
FIG. 12 is a schematic circuit diagram showing the secondary difference computing circuit used in Embodiment 2 to compute the secondary difference from the output of the line sensor.

As shown by FIG. 12, these secondary difference computing circuits 12, 22, 32 utilize three sample hold circuits 212a, 212b, 212c, respectively, to shift and sample successively output signals Vin from the respective pixels on the line sensors 10b, 20b, 30b and output signals from the sample hold circuits 212a, 212c are applied to +input terminal of an operational amplifier 212d via resistance of an appropriate value. Output of this operational amplifier 212d is applied to eight sample hold circuits 212e, 212f, 212g, 212h, 212i, 212j, 212k, 212m so as to be successively shifted and sampled by them. Then respective output signals from the operational amplifier 212d and the sample hold circuit 212m are applied to +input terminal of an operational amplifier 212n via resistance of an appropriate value while output from the sample hold circuit 212h is applied to −input terminal of the operational amplifier 212n. Consequently, output signals from a pair of continuous pixels in the line sensor 10b (20b, 30b) are smoothed in the secondary difference computing circuit 12 (22, 32) and a secondary difference is computed based on output signals of four pixels lying beyond the smoothed extent, according to the following equation:

$$Vout = (R2/(4*R1)) * ((Vin(n) + Vin(n-1)) - 2* - (Vin(n-2) + Vin(n-3)) + (Vin(n-4) + Vin(n-5))) \quad (16)$$

Figure 13:
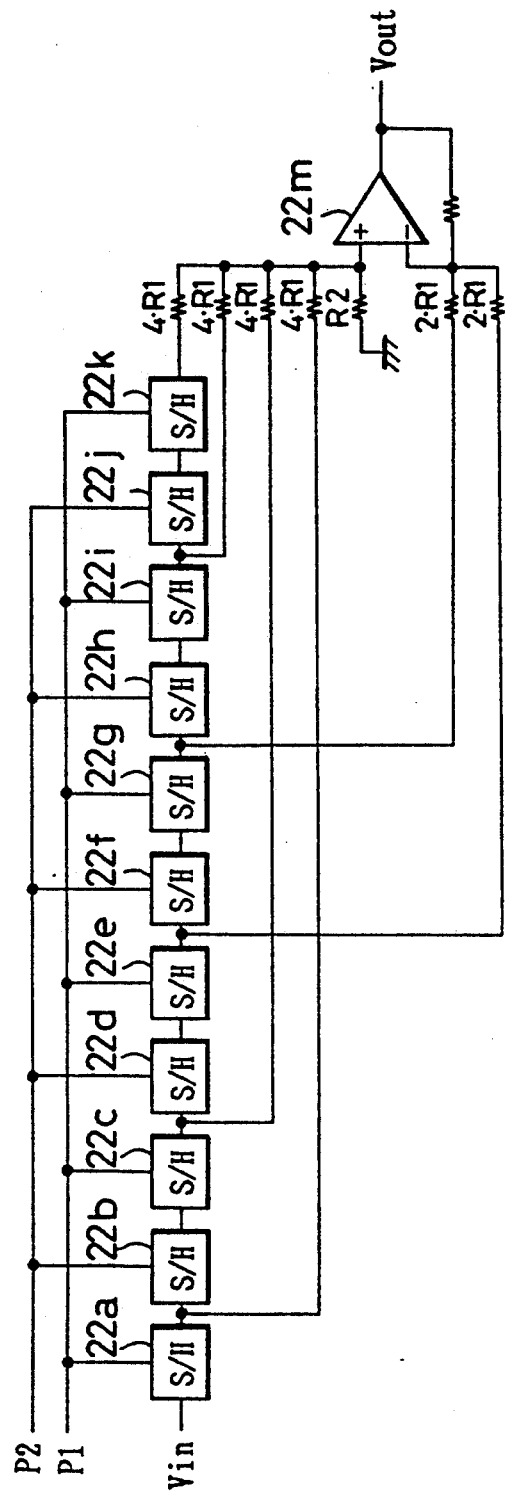
FIG. 13 is a schematic circuit diagram showing the alternative secondary difference computing circuit used in Embodiment 2 to compute the secondary difference from the output of the line sensor.

Referring to FIG. 13, there is shown further alternative arrangement of the secondary difference computing circuit 12 (22, 32). These secondary difference computing circuits 12, 22, 32 utilize eleven sample hold circuits 22a, 22b, 22c, 22d, 22e, 22f, 22g, 22h, 22i, 22j, 22k to shift and sample successively output signals Vin from the respective pixels of the line sensors 10b, 20b, 30b, and output signals from the sample hold circuits 22a, 22c, 22i, 22j, 22k are applied to +input terminal of the operational amplifier 212m. Consequently, the secondary difference is computed by the secondary difference circuit 12 (22, 32) according to the above-mentioned equation (16).

Figure 14:
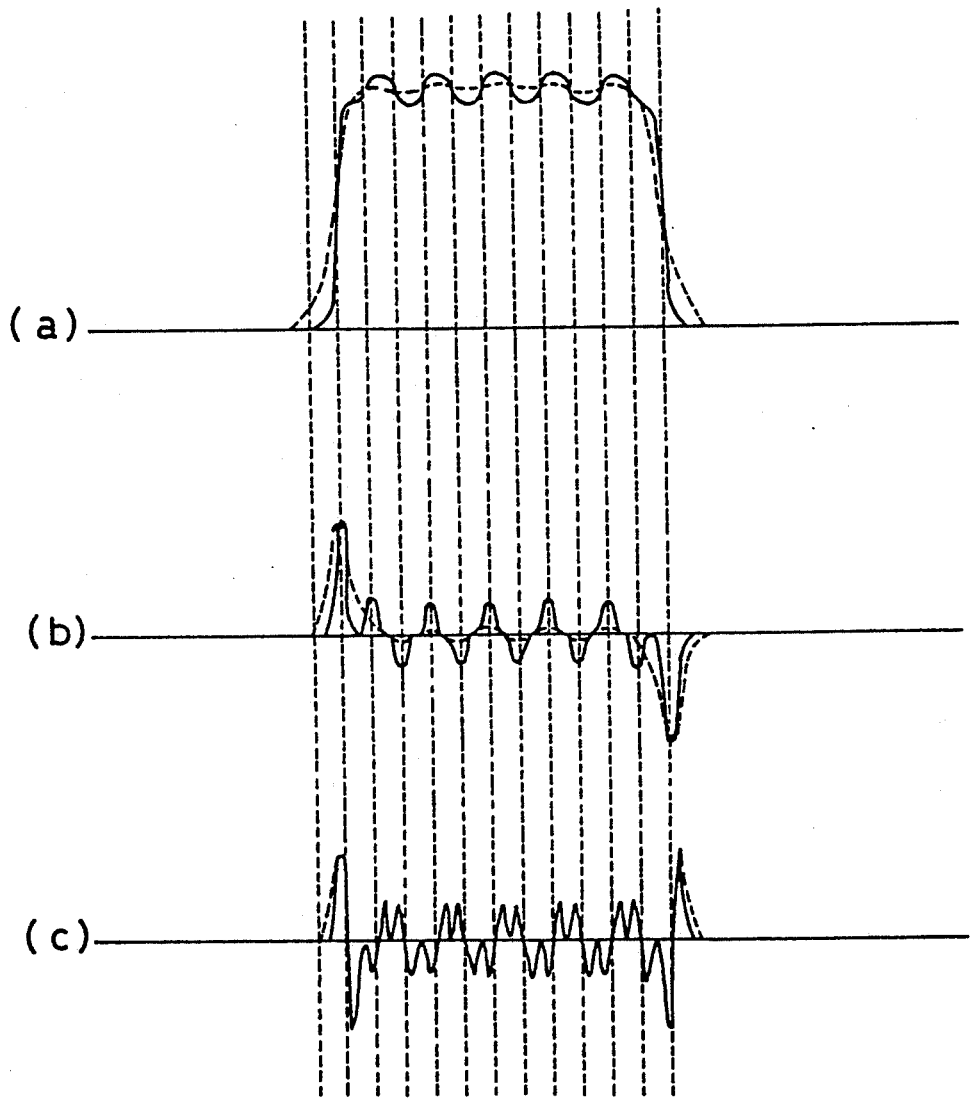
FIG. 14 is a waveform diagram showing the luminance distribution on a photographed scene having a repetitive pattern and the corresponding primary and secondary difference signal waveforms comprising non-smoothed output waveforms as represented by solid lines and smoothed output waveforms as represented by broken lines.

FIG. 14 is a signal waveform diagram showing a luminance distribution (a) on the scene to be photographed, the corresponding primary difference (b) and secondary difference (c). For the scene having a fine repetitive pattern on the surface thereof, the respective line sensors 10b, 20b, 30b provide signals each presenting a repetitive undulation corresponding to the fine repetitive pattern of the scene and similar undulation behaves also in the primary difference signal waveform as well as the secondary difference signal waveform across the zero level. However, the output signals from the pixels lying within the predetermined extents of the respective line sensors 10b, 20b, 30b are smoothed by the associated secondary difference computing circuits 12, 22, 32 and the undulations as indicated by the solid lines corresponding to the respective pattern cancel one another as indicated by the broken lines in FIG. 14(a). The secondary difference computing circuits 12, 22, 32 compute respective secondary differences on the basis of the output signals from the pixels lying beyond the respective extents which have been subjected to smoothing and, therefore, none of the zero-cross points appearing due to the respective pattern of the scene is detected.

Figure 15:
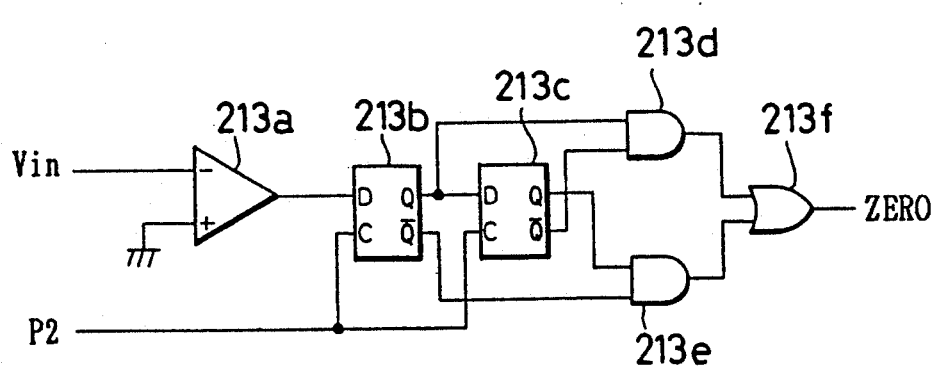
FIG. 15 is a schematic circuit diagram showing the zero-cross detecting circuit used in Embodiments 2, 3.1, 3.2 and 3.3 to detect the zero-cross point from the secondary difference signal obtained by the secondary difference computing circuit.
Figure 16:
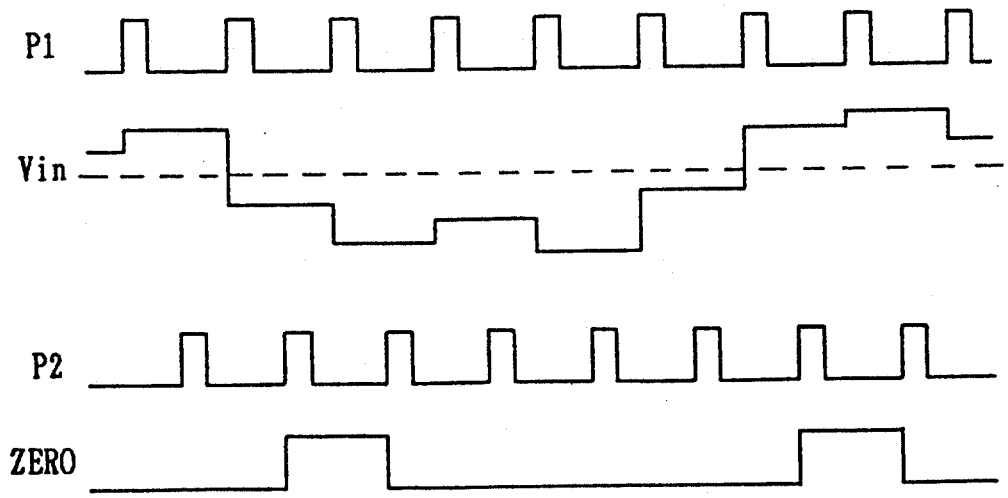
FIG. 16 is a voltage waveform time chart for the circuit of FIG. 12.

As will be seen in FIG. 1 showing Embodiment 1, the respective output signals from the secondary difference computing circuits 12, 22, 32 are applied to the associated zero-cross detecting circuits 13, 23, 33 which, in turn, detect the zero-cross points of the respective secondary differences obtained by the secondary difference computing circuits 12, 22, 32. As shown by FIG. 15, the output signal Vin of the secondary difference computing circuit 12 (22, 32) is applied to the input terminal of a comparator 213a and the reference terminal thereof is grounded. Flip-flops 213b, 213c are connected to the output terminal of the comparator 213a, Q output of the flip-flop 213b and $\overline{Q}$ output of the flip-flop 213c are applied to an AND circuit 213d while $\overline{Q}$ output of the flip-flop 213b and Q output of the flip-flop 213c are applied to an AND circuit 213e, and the output signals of these AND circuits 213d, 213e are applied to an OR circuit 213f. As will be apparent from the time chart of FIG. 16, the output signal Vin from the secondary difference computing circuit 12 is applied synchronously with a clock pulse P1 to the comparator 213a and, when this output signal Vin crosses the zero level and has its sign changed, the zero-cross signal in the form of a ZERO pulse is output synchronously with a clock pulse P2 from the flip-flops 213b, 213c. For the scene having a repetitive pattern on the surface thereof, none of the zero-cross points due to such repetitive pattern is detected so long as it concerns the output signals from the pixels lying within the predetermined extent which has been subjected to smoothing.

The zero-cross behavior signal waveforms thus obtained by the zero-cross detecting circuits 13, 23, 33 are applied to and stored in the respective zero-cross memory circuits 14, 24, 34.

With this Embodiment 2, the output signals from the pixels lying within the predetermined extent of each photosensor are smoothed and, therefore, even when the scene has the repetitive pattern on the surface thereof, the output signal from the photosensor is free from the influence of such repetitive pattern. Computation of the secondary difference is based on the output signals from the pixels lying beyond the above-mentioned predetermined extent which has been subjected to smoothing and none of the zero-cross behavior signals corresponding to the repetitive pattern is detected so far as this predetermined extent is concerned. Accordingly, an erroneous range finding due to the repetitive pattern is substantially excluded.

EMBODIMENT 3.1

Figure 17:
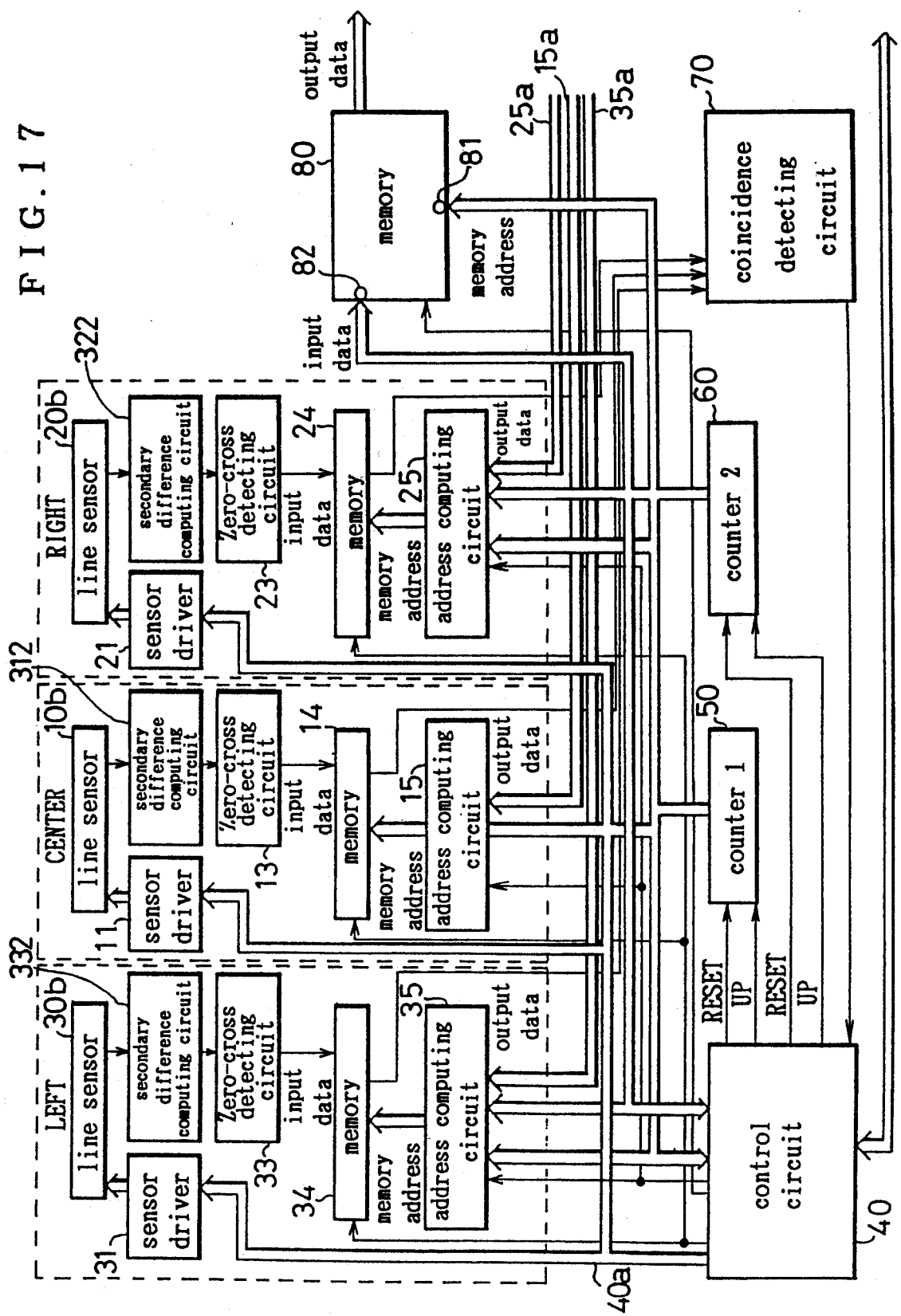
FIG. 17 is a circuit block diagram showing Embodiment 3.1 of the range finder for a passive-type autofocussing device constructed in accordance with the invention.

FIG. 17 is a circuit block diagram showing Embodiment 3.1.

Photosensors 10, 20, 30 comprise line sensors which comprise, in turn, photodetector arrays each including an appropriate number of pixels arranged side by side, and imaging lenses combined with the line sensors. Referring to FIG. 2 showing Embodiment 1, there are provided on the front side of the photographic camera three imaging lenses 10a, 20a, 30a so that light rays emitted from a scene to be photographed pass through these imaging lenses 10a, 20a, 30a and the scene is imaged on respective line sensors 10b, 20b, 30b placed behind the associated imaging lenses. These photosensors 10, 20, 30 are referred to hereinafter as the central sensor 10, the right side sensor 20 and the left side sensor 30 which optical axes 20c, 30c of the right side sensor 20 and the left side sensor 30, respectively, being arranged symmetrically with respect to an optical axis 10c of the central sensor 10. These line sensors 10b, 20b, 30b are referred to hereinafter as the central line sensor 10b, the right side line sensor 20b and the left side line sensor 30b.

The line sensors 10b, 20b, 30b are separately applied, as illustrated in FIG. 17, with drive signals from respective sensor drivers 11, 21, 31 and begin to pick up the light rays coming from the scene on the basis of the drive signals. The sensor drivers 11, 21, 31 are connected to a control circuit 40 via a drive control signal link 40a and controlled by a drive control signal provided from the control circuit 40.

Figure 18:
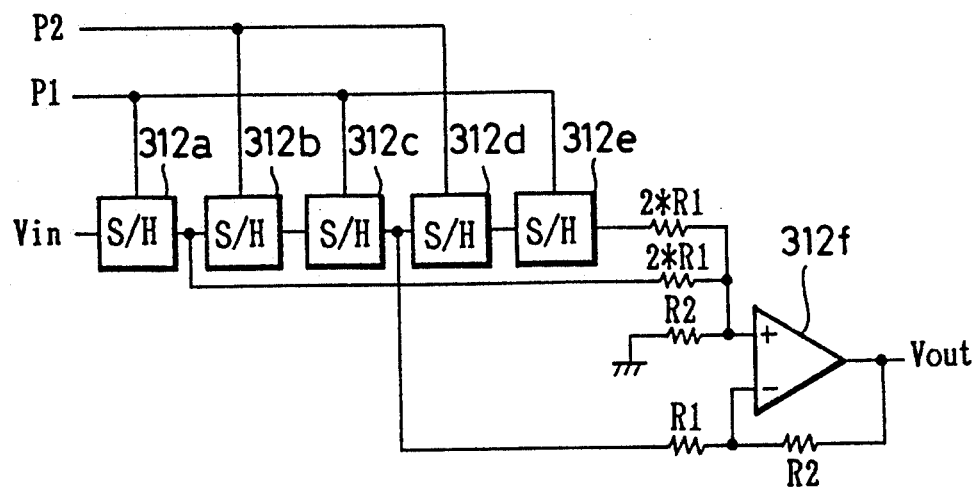
FIG. 18 is a circuit diagram of the secondary difference computing circuit used in Embodiment 3.1 to compute the secondary difference from the output of the line sensor.

As will be apparent from FIG. 17, secondary difference computing circuits 312, 322, 332 are connected to output terminals of the line sensors 10b, 20b, 30b, respectively, and these secondary difference computing circuits 312, 322, 332 compute secondary differences of the luminance distribution signals on the scene which have been obtained by the respective line sensors 10b, 20b, 30b. Referring to FIG. 18, these secondary difference computing circuits 312, 322, 332 utilize sample hold circuits 312a, 312b, 312c, 312d, 312e to shift and sample successively output signals Vin from the respective pixels of the line sensors 10b, 20b, 30b, and utilize an operational amplifier 312f and resistance of an appropriate value to compute secondary differences according to the following equation:

$$Vout = (R2/(2*R1))*(Vin(n-2) - 2*Vin(n-1) + Vin(n)) \quad (17)$$

Figure 19:
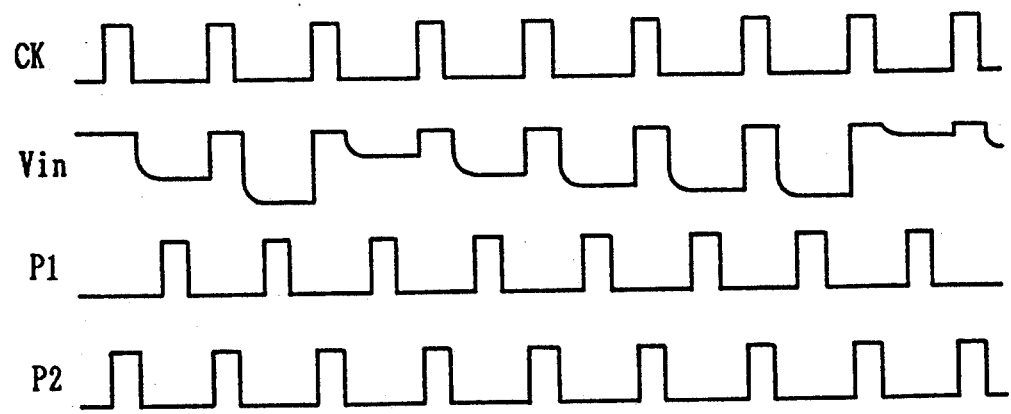
FIG. 19 is a voltage waveform time chart for the circuit of FIG. 18.
Figure 20A:
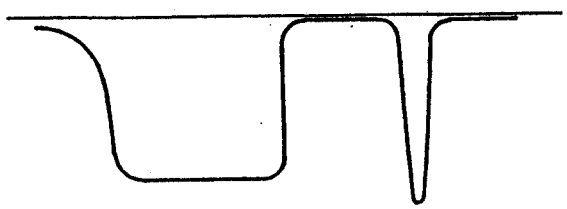
FIG. 20 is a waveform diagram showing the luminance distribution on a scene to be photographed and the corresponding primary and secondary difference signal waveforms.
Figure 20B:
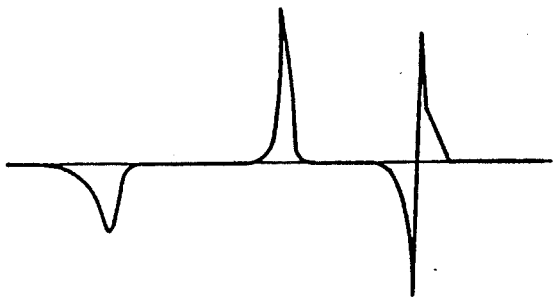
Figure 20C:
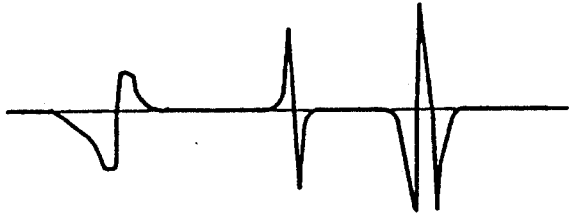

FIG. 19 is a time chart for these secondary difference computing circuits 312, 322, 332 and FIG. 20 is a waveform diagram showing (a) a scene luminance distribution waveform, (b) the corresponding primary difference waveform and (c) the corresponding secondary difference waveform.

Referring again to FIG. 17, output signals of the secondary difference computing circuits 312, 322, 332 are applied to zero-cross detecting circuits 13, 23, 33, respectively, which detect then zero-cross points of the respective secondary differences obtained by the secondary difference computing circuits 312, 322, 332. These zero-cross detecting circuits 13, 23, 33 are of the same arrangement as that of FIG. 15 and provide zero-cross signals in the form of ZERO pulses as illustrated by the time chart of FIG. 16.

Zero-cross behavior signal waveforms obtained by the zero-cross detecting circuits 13, 23, 33 are applied to stored in zero-cross memory circuits 14, 24, 34, respectively. These zero-cross behaviors are then stored at addresses which are output from respective address computing circuits 15, 25, 35 according to the pixel locations in the respective line sensors 10b, 20b, 30b. These address computing circuits 15, 25, 35 are supplied from externally operable adjuster means (not shown) with deviation adjusting signals via adjustment control signal links 15a, 25a, 35a. These deviation adjusting signals are used to adjust respective locations of the pixels in the respective line sensors 10b, 20b, 30b corresponding to the output signals with which the zero-cross data begin to be written into the associated zero-cross memory circuits 14, 24, 34, based on amounts of compensation for respective installation errors of the photosensors 10, 20, 30 which have been determined by range finding with respect to a scene at a known range. Assumed that these amounts of error compensation take a value of Cadj for the central memory circuit 14, a value of Radj for the right side memory circuit 24 and a value of Ladj for the left side memory circuit 34, the count signals (COUNTER 1) are applied from a first counter 50 to the address computing circuits 15, 25, 35 with successive increments and the zero-cross behavior signal waveforms are stored at the respective addresses corresponding to the respective pixels in accordance with the following equations:

$$\text{ADDRESS} = \text{COUNTER 1} - Cadj - S \quad (18)$$

for the central memory circuit 14, $$\text{ADDRESS} = \text{COUNTER 1} - Radj - S \quad (19)$$

for the right side memory circuit 24, and $$\text{ADDRESS} = \text{COUNTER 1} - Ladj \quad (20)$$

for the left side memory circuit 34. In the equations (18) and (19), S represents a constant. Assumed that the adjustment is to be made by an amount A, a relationship of $0 < Cadj, Radj, Ladj < (A-1)$ should be established.

Count signals (COUNTER 2) from a second counter 60 are applied to the address computing circuits 25, 35, just as in the previously described Embodiment 1, and count up and reset of the second counter 60 and the first counter 50 are under control of output signal from the control circuit 40. A coincidence detecting circuit 70 is connected to the respective output sides of the zero-cross memory circuits 14, 24, 34 and the output side of this coincidence detecting circuit 70 is connected to the control circuit 40. The count signal from the first counter 50 is applied to an address port 81 of a data memory circuit 80 while the count signal from the second counter 60 is applied to a range data port 82 of the data memory circuit 80. Both the count signals from the first counter 50 and the second counter 60 are also applied to the control circuit 40. The control circuit 40 supplies the data memory circuit 80 with a data memory signal on the basis of which the address data and the range data are stored in the data memory circuit 80.

Figure 8:
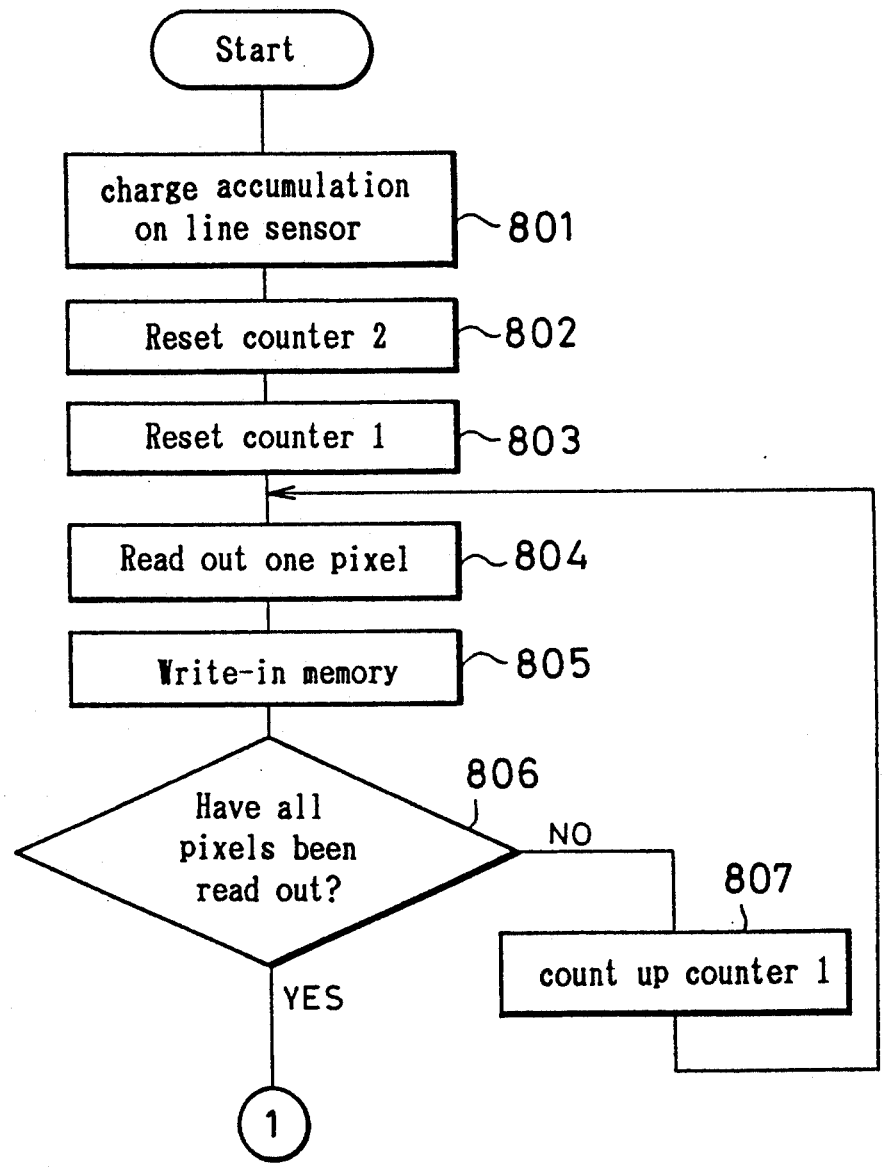
FIG. 8 is a voltage waveform flow chart of the routine executed in Embodiments 1, 2 and 3.1 to write the program data obtained from the respective line sensors into the associated zero-cross memory circuits.
Figure 9:
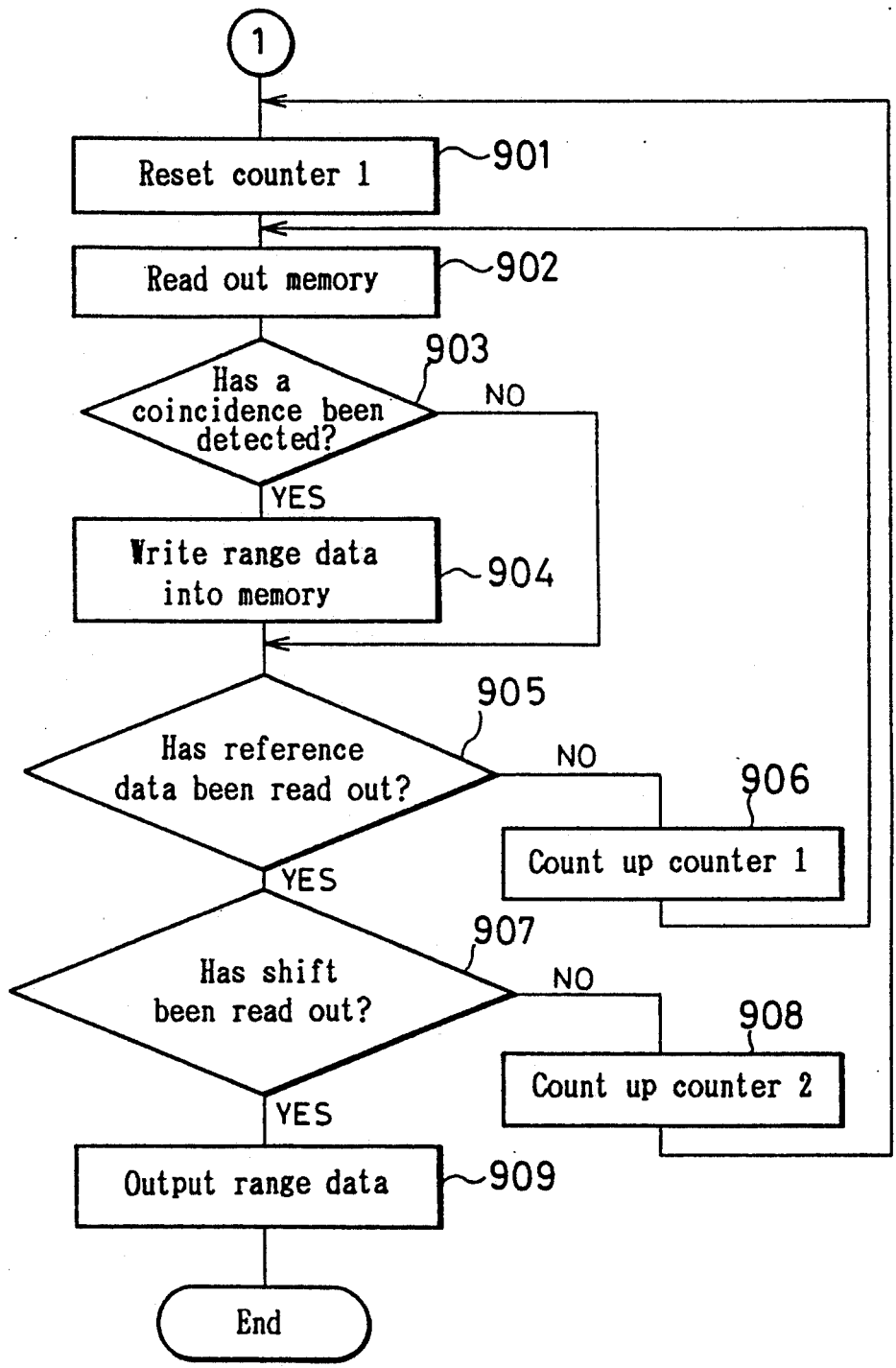
FIG. 9 is a flow chart of the program routine executed in Embodiments 1, 2 and 3.1 to read given data from the zero-cross memory circuits in order to detect a coincidence of the data stored in these zero-cross memory circuits.

Write-in and read-out of the luminance information are performed by a procedure similar to that in Embodiment 1 which has previously been described in reference with FIGS. 8 and 9 and read-out of the memory data is performed in accordance with the equations (13), (14), (15) corresponding to the equations (10), (11), (12), respectively. While a relationship between the write-in address and the read-out address is same as in the case of FIGS. 10 and 11, it will be readily understood from the equations (18), (19), (20), that the write-in addresses contain the respective amounts of compensation Cadj, Radj, Ladj.

With such arrangement of this Embodiment 3.1, luminance information on the scene to be photographed can be reliably computed and thereby an erroneous range finding can be substantially avoided because the pixel in each line sensor corresponding to the output signal with which the zero-cross point data begins to be written into the associated zero-cross memory circuit is adjusted by the externally operable adjuster means even if there exists a certain error which has occurred during installation of this photosensor in the range finder.

EMBODIMENT 3.2

Referring to FIGS. 21 through 25, Embodiment 3.2 will be described.

Figure 22:
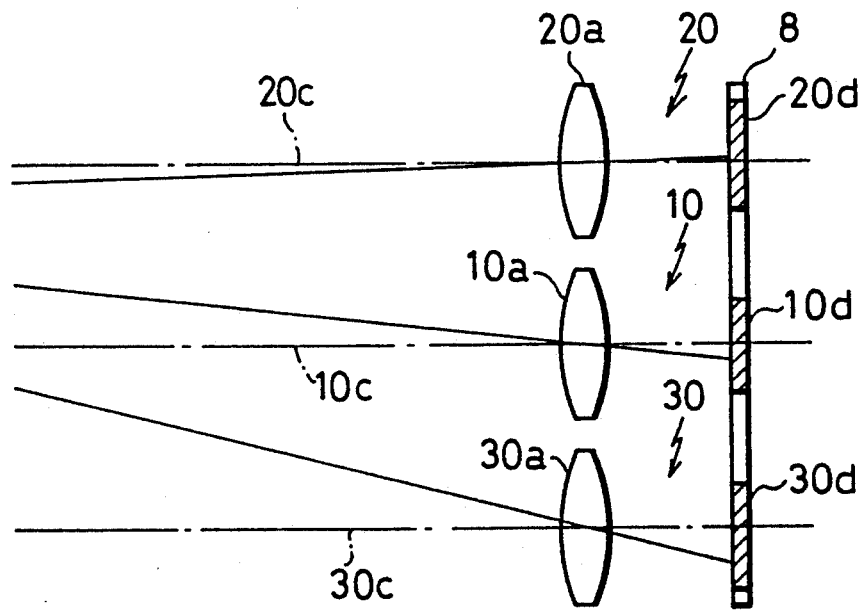
FIG. 22 is a side view schematically showing the photosensors used in Embodiments 3.2 and 3.3.

The photosensors 10, 20, 30 are provided by a single line sensor which, in turn, comprises a photodetector array including an appropriate number of pixels arranged side by side, and three imaging lenses combined with the line sensor. Referring to FIG. 22, there are provided on the front side of the photographic camera three imaging lenses 10a, 20a, 30a so that light rays emitted from a scene to be photographed pass through these imaging lenses 10a, 20a, 30a and imaged on corresponding zones of the line sensor 8 placed behind the imaging lenses. The line sensor 8 is accordingly divided into three sections, i.e., the central section 10d, the right side section 20d and the left side section 30d. The photosensors 10, 20, 30 are designated hereinafter as the central sensor 10, the right side sensor 20 and the left side sensor 30 with optical axes 20c, 30c of the right side sensor 20 and the left side sensor 30, respectively, being arranged symmetrically with respect to an optical axis 10c of the central sensor 10.

Figure 21:
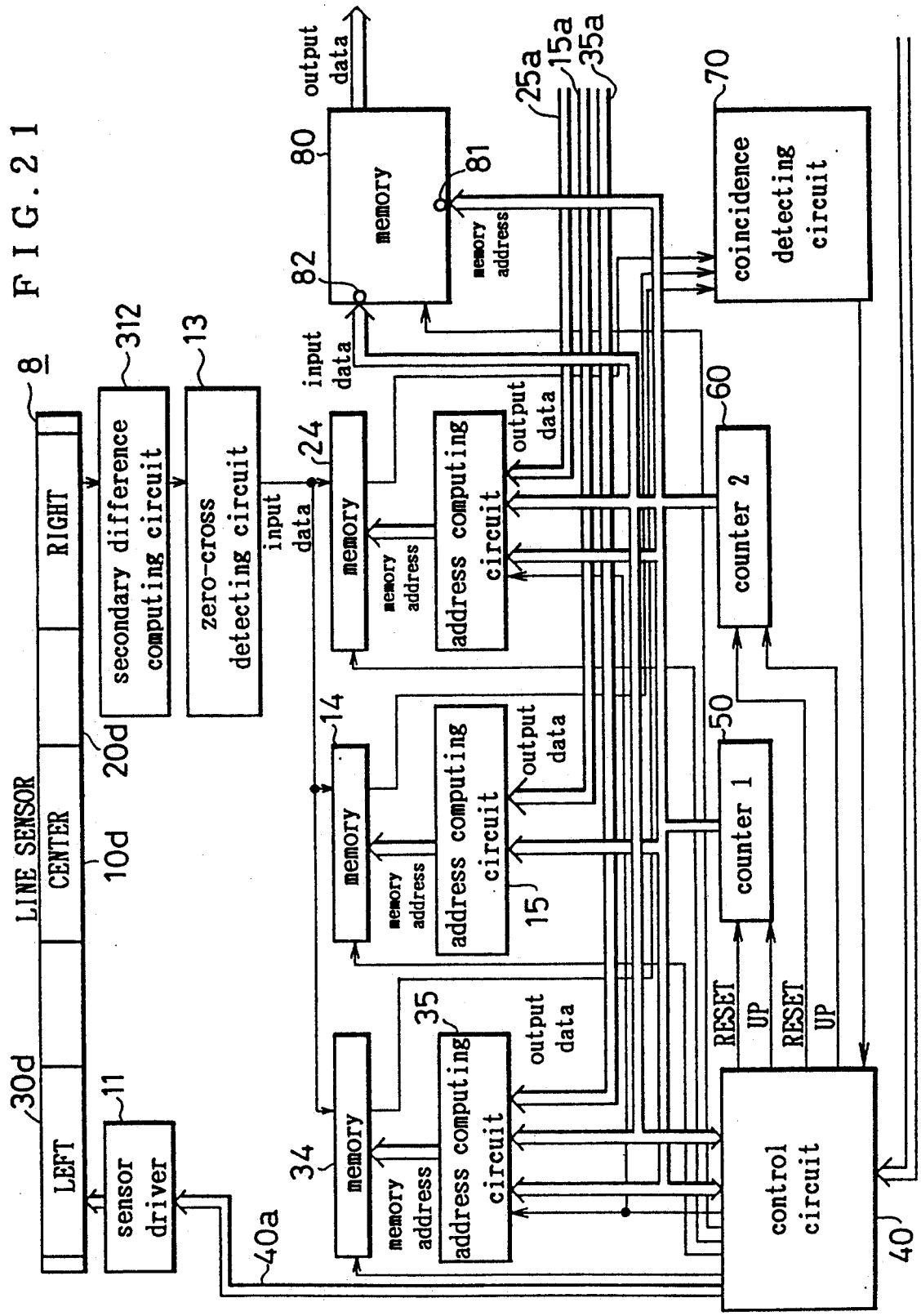
FIG. 21 is a circuit block diagram showing Embodiment 3.2 of the range finder for passive-type autofocusing device constructed in accordance with the invention.

The line sensor 8 is applied, as illustrated in FIG. 21, with a drive signal from the sensor driver 11 and begins to pick up the light rays coming from the scene based on the drive signal. The sensor driver 11 is connected to the control circuit 40 via the drive control signal link 40a and controlled by a drive control signal provided from the control circuit 40.

As will be apparent from FIG. 21, the secondary difference computing circuit 12 is connected to the output terminal of the line sensor 8 and the secondary difference computing circuit 12 computes the secondary difference of the luminance distribution signals which have been obtained by the line sensor 8. The secondary difference computing circuit 12 is identical to that used in Embodiment 3.1 illustrated by FIG. 18 and computes the secondary difference according to the previously mentioned equation (17).

The output signal of the secondary difference computing circuit 12 is applied, as shown in FIG. 21, to the zero-cross detecting circuit 13 which detects then the zero-cross point of the secondary difference obtained by this secondary difference computing circuit 12. This zero-cross detecting circuit 13 is identical to that used in Embodiment 2 illustrated by FIG. 15.

Zero-cross behavior signal waveform obtained by the zero-cross detecting circuit 13 is divided into three portions corresponding to the central section 10d, the right side section 20d and the left side section 30d of the line sensor 8, respectively, then separately applied to and stored in the zero-cross memory circuits 14, 24, 34, respectively. These zero-cross behaviors are then stored in addresses which are output from respective address computing circuits 15, 25, 35 according to the pixel locations in the central section 10d, the right side section 20d and the left side section 30d of the line sensor 8. These address computing circuits 15, 25, 35 are applied from the externally operable adjuster means (not shown) with the deviation adjusting signals via adjustment control signal links 15a, 25a, 35a. These deviation adjusting signals are used to adjust respective locations of the pixels in the respective line sensors 10b, 20b, 30b corresponding to the output signals with which the zero-cross data begin to be written into the associated zero-cross memory circuits 14, 24, 34, based on amounts of compensation for respective installation errors of the photosensors 10, 20, 30 which have been determined by range finding with respect to a scene at a known range. Assumed that these amounts of error compensation take a value of Cadj for the central memory circuit 14, a value of Radj for the right side memory circuit 24 and a value of Ladj for the left side memory circuit 34, the count signals (COUNTER 1) are applied from a first counter 50 to the address computing circuits 15, 25, 35 with successive increments and the zero-cross behavior signal waveforms are stored at the respective addresses corresponding to the respective pixels in accordance with the following equations:

$$\text{ADDRESS} = \text{COUNTER 1} - \text{Cadj} \quad (21)$$

for the central memory circuit 14, $$\text{ADDRESS} = \text{COUNTER 1} - \text{Radj} \quad (22)$$

for the right side memory circuit 24, and $$\text{ADDRESS} = \text{COUNTER 1} - \text{Ladj} \quad (23)$$

for the left side memory circuit 34. Assumed that the adjustment is to be made by an amount A, a relationship of $0 < \text{Cadj, Radj, Ladj} < (A-1)$ should be established.

Count signals (COUNTER 2) from a second counter 60 are applied to the address computing circuits 25, 35, just as in the previously described Embodiment 3.1, and count up and reset of the second counter 60 and the first counter 50 are under control of output signal from the control circuit 40. A coincidence detecting circuit 70 is connected to the respective output sides of the zero-cross memory circuits 14, 24, 34 and the output of this coincidence detecting circuit 70 is connected to the control circuit 40. The count signal from the first counter 50 is applied to an address port 81 of a data memory circuit 80 while the count signal from the second counter 60 is applied to a range data port 82 of the data memory circuit 80. Both the count signals from the first counter 50 and the second counter 60 are also applied to the control circuit 40. The control circuit 40 supplies the data memory circuit 80 with a data memory signal on the basis of which the address data and the range data are stored in the data memory circuit 80.

Figure 23:
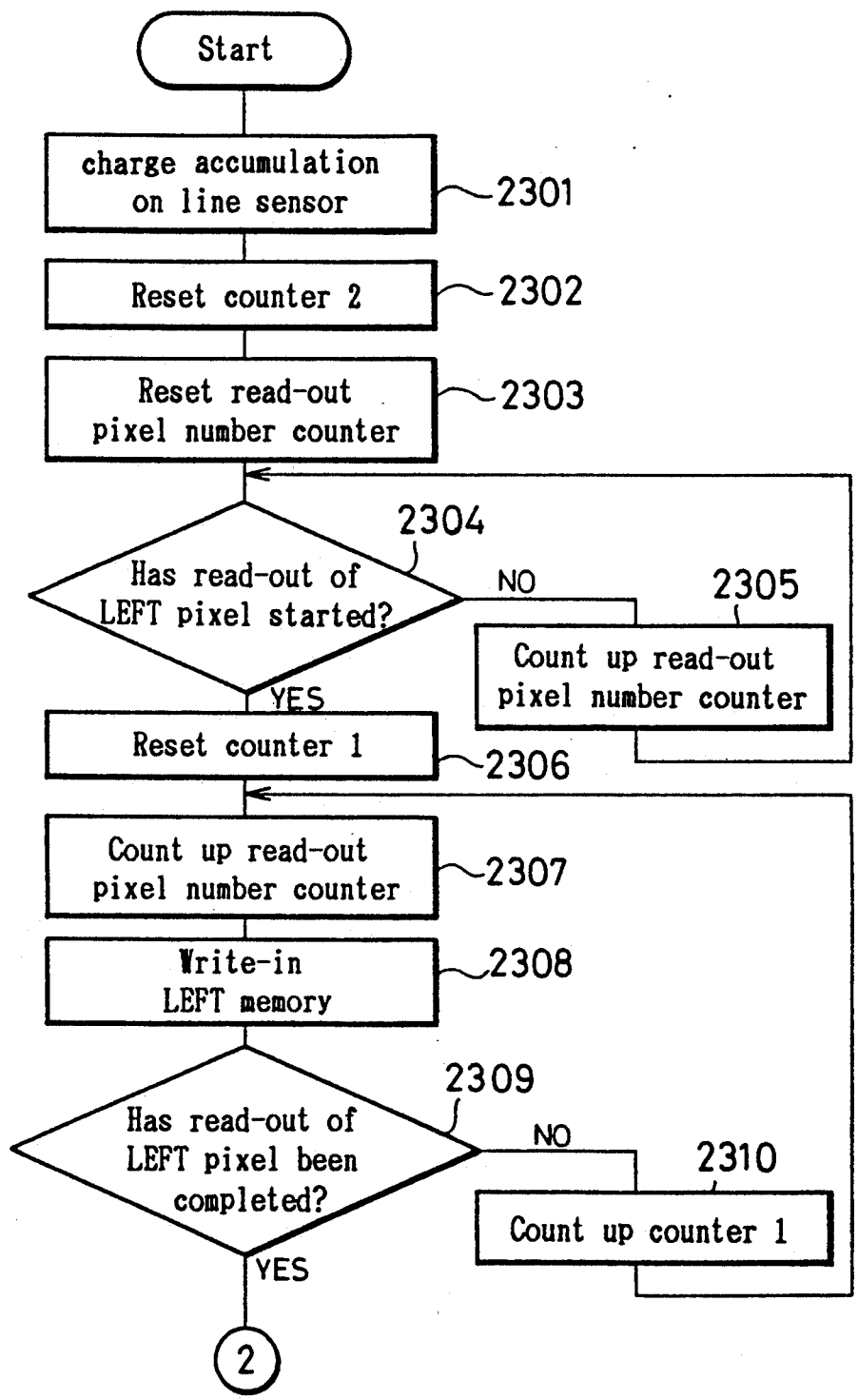
FIG. 23 is a flow chart of the program routine executed in Embodiments 3.2 and 3.3 to write the data obtained from the line sensor, particularly from the left section thereof, into the zero-cross memory circuit.

Now referring to FIGS. 23 through 25, a routine to write and read the luminance information in and from the memories for a given scene to be photographed will be described.

Upon start of range finding, charge accumulation takes place on the line sensor 8 (step 2301), then the second counter 60 is reset (step 2302), and a read-out pixel number counter (not shown) provided within the control circuit 40 is reset (step 2303).

It is determined from a count value of the read-out pixel number counter whether read of a first pixel in the left side section 30d of the single line sensor 8 started or not (step 2304) and the pixels are output one by one (step 2305) until data corresponding to the first pixel begins to be read out. When the first pixel begins to be read out, the first counter 50 is reset (step 2306). Data corresponding to one pixel in the left side section 30d of the line sensor 8 is read out (step 2307) and this read-out data is written into the left side zero-cross memory circuit 34 (step 2308). It should be understood that a zero-cross detection is executed between the steps 2307 and 2308. Next, the routine proceeds to a step 2309 to determine whether read-out concerning all the pixels has been completed or not, based on a value of the first counter 50. If not, the routine proceeds to a step 2310 to count up the first counter 50 and then returns to the step 2307 to read one pixel, following by writing it into the left side zero-cross memory circuit 34 (step 2308). The data written into the zero-cross memory circuit 34 is stored at the address assigned by the address computing circuit 35, based on the count signal from the first counter 50. The address at which the data is to be stored is assigned according to the above-mentioned equation (23). When the addresses are negative, no write-in occurs.

If read-out of all the pixels in the left side section 30d of the line sensor 8 has been completed and thus conclusion of this step 2309 is YES, the routine proceeds to a step 2403 (FIG. 24) to detect read-out of the first pixel in the central section 10d of the line sensor based on a count value of the read-out pixel number counter and the pixels are output one by one (step 2404) until read-out of the first pixel starts. If read-out of the first pixel has started, the first counter 50 is reset (step 2405) and then the same steps as the steps 2307 through 2310 are repeated. Namely, the pixels in the central section 10d of the line sensor are read out one by one (step 2406) in parallel with the zero-cross detection, then written into the central zero-cross memory circuit 14 (step 2407) and it is determined whether all the pixels in the central section 10d of the line sensor have been completely read out, based on the count value of the first counter 50 (step 2408) while the first counter 50 is counted up (step 2409). The address at which the data is to be stored is assigned according to the previously mentioned equation (21). When the addresses are negative, no write-in occurs.

If all the pixels in the central section 10d of the line sensor have been read out and conclusion of the step 2408 is YES, the routine proceeds to a step 2503 (FIG. 25) to detect read-out of the first pixel in the right side section 20d of the line sensor, based on the count value of the read-out pixel number counter while the pixels are output one by one (step 2504). If read-out of the first pixel has started, the first counter 50 is reset (step 2505). Then, the same routine as those for the left side section 30d and the central section 10d of the line sensor 8 is repeated for the right side section 20d of the line sensor 8. More specifically, the pixels in this right side section 20d are read out one by one (step 2506) in parallel with the zero-cross detection, then written into the right side zero-cross memory circuit 24 (step 2507) and it is determined whether all the pixels in the right side section 20d of the line sensor 8 have been completely read out (step 2508) while the first counter 50 is counted up (step 2509). The data written into the right side zero-cross memory circuit 24 is stored at the address assigned according to the equation (22), based on the count signal from the first counter 50.

If read-out of all the pixels in the line sensor 8 has been completed and thus conclusion of the step 2508 is YES, a routine similar to the routine comprising steps 901 through 909 as illustrated by FIG. 9 will be followed. Specifically, the memory data are read out from the respective zero-cross memory circuits 14, 24, 34 and applied to the coincidence detecting circuit 70 which then detects a coincidence of the data read out from the central zero-cross memory circuit 14, the right side zero-cross memory circuit 24 and the left side zero-cross memory circuit 34, respectively. Upon completion of the shift read-out, the range data are output from the data memory circuit 80 (step 909).

In coincidence detection of the data stored in the zero-cross memory circuits 14, 24, 34, the first counter 50 cooperates with the address computing circuits 15, 25, 35 to read the data from the central zero-cross memory circuit 14, the right side zero-cross memory circuit 24 and the left side zero-cross memory circuit 34 in accordance with the previously mentioned equations (21), (22), (23) corresponding to the equations (13), (14), (15) of Embodiment 1. A relationship between the write-in address and the read-out address is same as in the case of Embodiment 1 illustrated by FIGS. 10 and 11. The write-in addresses are given by the equations (21), (22), (23) containing the respective amounts of compensation Cadj, Radj, Ladj.

With such arrangement of this Embodiment 3.2, both the secondary difference computing circuit and the zero-cross detecting circuit may be single, respectively, since there is provided a single line sensor divided into three sections. Compared to the range finder according to Embodiment 1, 2 or 3.1 employing three separate line sensors, each associated with three secondary difference computing circuits and three zero-cross detecting circuits, the range finder according to this Embodiment 3.2 comprises a single line sensor, a single secondary difference computing circuit and a single zero-cross detecting circuit and the number of parts may be correspondingly reduced.

EMBODIMENT 3.3

Now Embodiment 3.3 will be described in reference with FIG. 26.

As in Embodiment 3.2, this Embodiment 3.3 also adopts a single line sensor 8 divided into three sections as referred to hereinafter as the central line sensor section 10d, the right side line sensor section 20d and the left side line sensor section 30d. Output signal from this line sensor 8 is applied to the secondary difference computing circuit 12 which computes then a secondary difference according to the previously mentioned equation (17) and the secondary difference output from the circuit 12 is applied to the zero-cross detecting circuit 13.

Signal waveform of the zero-cross behavior obtained by the zero-cross detecting circuit 13 is divided into three portions corresponding to the central line sensor section 10d, the right side line sensor section 20d and the left side line sensor section 30d, respectively, and separately applied to and stored in the respective zero-cross memory circuits 14, 24, 34. These signal waveform portions of the zero-cross behavior are then stored, for the right side section 20d and the left side section 30d of the line sensor 8, at the addresses which are output from respective address computing circuits 25, 35 according to the pixel locations in these sections 20d, 30d, respectively, and, for the central line sensor section 10d, stored according to the count signals (COUNTER 1) of the first counter 50. More specifically, the count signals (COUNTER 1) are applied from the first counter 50 to the address computing circuits 25, 35 and these count signals (COUNTER 1) are also applied to the central memory circuit 14 with successive increment. Thus the zero-cross behavior signal waveforms are stored, for the respective pixels, at the addresses given by the following equations:

$$ADDRESS = COUNTER\ 1 \tag{24}$$

for the central memory circuit 14, $$ADDRESS = COUNTER\ 1 \tag{25}$$

for the right side memory circuit 24, and $$ADDRESS = COUNTER\ 1 \tag{26}$$

for the left side memory circuit 34.

Count signals (COUNTER 2) are applied from the second counter 60 to the address computing circuits 25, 35. Count up and reset of the second counter 60 and the first counter 50 are made under control of the output signal from the control circuit 40. The second counter 60 increments the address for every read-out of data from the zero-cross memory circuits 24, 34. The address computing circuits 25, 35 are also supplied from the control circuit 40 with address processing information on the basis of which the address computing circuits 25, 35 provide predetermined write/read signals with respect to the zero-cross memory circuits 24, 34.

Output terminals of the zero-cross memory circuits 14, 24, 34 are together tied to the coincidence detecting circuit 70 of which the output is applied to the control circuit 40.

The count signal from the first counter 50 is applied to the address port 81 of the data memory circuit 80 while the count signal from the second counter 60 is applied to the range data port 82 of the data memory circuit 80. Both the count signals from the first counter 50 and the second counter 60 are also applied to the control circuit 40. The control circuit 40 supplies the data memory circuit 80 with a data memory signal on the basis of which the address data and the range data are stored in the data memory circuit 80.

The control circuit 40 is supplied from externally operable adjuster means (not shown) with a deviation adjusting signals via adjustment control signal links 40b, 40c, 40d. The deviation adjusting signal functions to adjust respective locations of the pixels in the respective line sensors 10d, 20d, 30d corresponding to the output signals with which the zero-cross data begin to be written into the associated zero-cross memory circuits 14, 24, 34, based on amounts of compensation for respective installation errors of the photosensors 10, 20, 30 which have been determined by operation of range finding made with respect to a scene at a known range. Normally it is determined on the basis of a count value of the read-out pixel number counter whether first pixel read-out has started or not in the respective portions associated with the left side line sensor section 30d, the central line sensor section 10d and the right side line sensor section 20d. However, in view of the above-mentioned installation errors of the photosensors 10, 20, 30, the deviation adjusting signal pre-offsets the count value of the read-out pixel number counter corresponding to the read-out start pixel location so that the write-in starts from this offset read-out pixel location while the count signal (COUNTER 1) drives the zero-cross memory circuit 14 and the address computing circuits 25, 35.

Luminance information on the scene to be photographed is written into and read out from the memory circuits by following the same steps of routine as in Embodiment 3.2. Specifically, the luminance information is written into the respective zero-cross memory circuits 14, 24, 34 under the pre-offset condition in order that the installation errors of the photosensors 10, 20, 30, if any, may be effectively compensated. Thus, under such pre-offset condition, the count signals (COUNTER 1) are applied from the first counter 50 not only to the address computing circuits 25, 35 but also to the central memory circuit 14 with successive increment, and the luminance data for the respective pixels are stored at the addresses given by the following equations:

$$ADDRESS = COUNTER\ 1 \tag{27}$$

for the central memory circuit 14, $$ADDRESS = COUNTER\ 1 \tag{28}$$

for the right side memory circuit 24, and $$ADDRESS = COUNTER\ 1 \tag{29}$$

for the left side memory circuit 34. The first counter 50 cooperates with the address computing circuits 25, 35 to read the luminance data for the respective pixels from the addresses given by the following equations:

$$ADDRESS = COUNTER\ 1 \tag{30}$$

for the central zero-cross memory circuit 14, $$ADDRESS = COUNTER\ 1 + COUNTER\ 2 \tag{31}$$

for the right side zero-cross memory circuit 24, and $$ADDRESS = COUNTER\ 1 + S - COUNTER\ 2 \tag{32}$$

for the left side zero-cross memory circuit 34. It should be understood that S in the equation (32) represents a constant. A relationship established between write-in address and read-out address is similar to those in the cases of FIG. 10 and FIG. 11.

EFFECT OF THE INVENTION

The range finder for passive-type autofocusing device of the invention allows a computative processing required for range finding to be achieved more rapidly than the conventional range finder adapted to derive the range data from correlational computation, since the range finder of the invention is so arranged, as will be apparently understood from the foregoing detailed description, that the luminance of a scene to be photographed is picked up by three line sensors, secondary differences are computed from respective luminance data provided by the respective line sensors, zero-cross data characterized by zero-cross points of these secondary differences are stored in respective memory circuits, one of these three zero-cross data is selected as the reference zero-cross data, the other two zero-cross data are successively shifted by one pixel at a time, respectively, with respect to the reference zero-cross data until a coincidence of these three zero-cross data is detected, and an amount of such shifting which has been required to reach the coincidence is used as a range data to determine a range to the scene. In this manner, the range finder of this invention is particularly useful for reliably catching a dynamic scene to be photographed and rapidly focusing on it.

Additionally, the range finder of the invention allows the range data to be obtained at a high precision because the invention relies upon comparison of zero-cross data associated with the respective secondary differences instead of depending upon the luminance distribution pattern on each line sensor.

What is claimed is:

1. A range finder for a passive-type autofocusing device comprising:
   three photosensors to pick up a luminance distribution on a scene to be photographed;
   secondary difference computing circuits coupled to said photosensors to compute secondary differences of output signals from the respective photosensors;
   zero-cross detecting circuits coupled to said secondary difference computing circuits to detect zero-cross points of output signals from the respective secondary difference computing circuits so long as these zero-cross points are those appearing when primary differences derived from computation of the secondary differences have absolute values larger than a predetermined value;
   zero-cross memory circuits coupled to said detecting circuit, for storing zero-cross behavior signals obtained by the respective zero-cross detecting circuits; and
   a coincidence detecting circuit coupled to said memory circuits to compare the zero-cross behavior signals stored in the respective zero-cross memory circuits with one another and thereby to detect a coincidence of these zero-cross behavior signals; wherein one of those three photosensors is selected as the reference photosensor and the zero-cross behavior signals obtained from the other two photosensors are successively shifted relative to the zero-cross behavior signal obtained from the reference photosensor until a coincidence of these three zero-cross behavior signals is detected by the coincidence detecting circuit and a range to the scene is computed based on an amount of such shifting.

2. A range finder for a passive-type autofocusing device as recited in claim 1, wherein each of the secondary difference computing circuits smoothes output signals from pixels lying within a predetermined continuous extent in each of the photosensors and computes the difference based on output signals from the pixels lying beyond the extent having been subjected to smoothing.

3. A range finder for a passive-type autofocusing device as recited in claim 2 and further comprising externally operable adjuster means for position-adjustment of the pixel in each line sensor providing the output signal with which the write-in of the zero-cross point data to the associated zero-cross memory circuit is initiated so that a position at which the write-in to the zero-cross memory circuit may be adjusted by the adjuster means.

4. A range finder for a passive-type autofocusing device as recited in claim 1 and further comprising externally operable adjuster means for position-adjustment of the pixel in each line sensor providing the output signal with which the write-in of the zero-cross point data to the associated zero-cross memory circuit is initiated so that a position at which the write-in to the zero-cross memory circuit may be adjusted by the adjuster means.

5. A range finder for a passive-type autofocusing device comprising:
   three photosensors to pick up a luminance distribution on a scene to be photographed;
   secondary difference computing circuits coupled to said photosensors to compute secondary differences of output signals from the respective photosensors;
   zero-cross detecting circuits coupled to said secondary difference computing circuits to detect zero-cross points of output signals from the respective secondary difference computing circuits;
   zero-cross memory circuits coupled to said detecting circuits for storing the zero-cross behavior signals obtained by the respective zero-cross detecting circuits; and
   a coincidence detecting circuit coupled to said memory circuits to compare the zero-cross behavior signals stored in the respective zero-cross memory circuits with one another and thereby to detect a coincidence of these three zero-cross behavior signals; wherein each of the secondary difference computing circuits smoothes output signals from pixels lying within a predetermined continuous extent in each of the photosensors and computes the difference based on output signals from the pixels lying beyond the extent having been subjected to smoothing; and wherein one of those three photosensors is selected as the reference photosensor and the zero-cross behavior signals obtained from the other two photosensors are successively shifted with respected to the zero-cross behavior signal obtained from the reference photosensor until a coincidence is detected by the coincidence detecting circuit and a range to the scene is computed based on an amount of such shifting.

6. A range finder for a passive-type autofocusing device as recited in claim 5 and further comprising externally operable adjuster means for position-adjustment of the pixel in each line sensor providing the output signal with which the write-in of the zero-cross point data to the associated zero-cross memory circuit is initiated so that a position at which the write-in to the zero-cross memory circuit may be adjusted by the adjuster means.

7. A range finder for passive-type autofocusing device comprising:

three photosensors to pick up a luminance distribution on a scene to be photographed;

secondary difference computing circuits coupled to said photosensors to compute secondary differences of output signals from the respective photosensors;

zero-cross detecting circuits coupled to said secondary difference computing circuits to detect zero-cross points of output signals from the respective secondary difference computing circuits;

zero-cross memory circuits coupled to said detecting circuits for storing zero-cross behavior signals obtained by respective zero-cross detecting circuits; and a coincidence detecting circuit coupled to said memory circuits to compare the zero-cross behavior signals stored in the respective zero-cross memory circuits with one another thereby to detect a coincidence of these zero-cross behavior signals; wherein there is provided means for position-adjustment of the pixel in each line sensor providing the output signal which initiates write-in of the zero-cross point data to the associated zero-cross memory circuit; wherein a position at which the write-in to the zero-cross memory circuit starts is adjusted by the adjuster means for each photosensor; and wherein one of those three photosensors is selected as the reference photosensor and the zero-cross behavior signals obtained from the other two photosensors are successively shifted with respect to the zero-cross behavior signal obtained from the reference photosensor until a coincidence of these three zero-cross behavior signals is detected by the coincidence detecting circuit and a range to the scene is computed based on an amount of such shifting.

8. A range finder for a passive-type autofocusing device comprising:
a photosensor to pick up a luminance distribution on a scene to be photographed, the photosensor consisting of a single line sensor divided into three sections and three imaging lenses adapted to image the scene on the respective sections of the line sensor;

a single secondary difference computing circuit coupled to said photosensor to compute a secondary difference of an output signal from the line sensor;

a single zero-cross detecting circuit coupled to said difference computing circuit to detect zero-cross points of an output signal from the second difference computing circuit so long as these zero-cross points are those appearing when a primary difference derived from computation of the secondary difference has an absolute value larger than a predetermined value;

zero-cross memory circuits coupled to said detector circuit and associated with the three sections of the line sensor, respectively, to store zero-cross behavior signals obtained by the zero-cross detecting circuit; and a coincidence detecting circuit coupled to said memory circuits to compare the zero-cross behavior signals stored in the respective zero-cross memory circuits and thereby to detect a coincidence of these zero-cross behavior signals; wherein one of the three line sensor sections is selected as the reference line sensor section and the zero-cross behavior signals obtained from the other two line sensor sections are successively shifted with respect to the zero-cross behavior signal obtained from the reference line sensor section until a coincidence of these zero-cross behavior signals is detected by the coincidence detecting circuit and a range to the scene is computed based on an amount of such shifting.

9. A range finder for a passive-type autofocusing device as recited in claim 8, wherein the secondary difference computing circuit smoothes output signals from pixels lying with a predetermined continuous extent in the photosensor and computes the difference based on output signals from the pixels lying beyond the extend having been subjected to smoothing.

10. A range finder for a passive-type autofocusing device as recited in claim 9 and further comprising means for position-adjustment of the pixel in each line sensor section providing the output signal which initiates write-in of the zero-cross point data to the associated zero-cross memory circuit so that a position at which the write-in to the zero-cross memory circuit may be adjusted by the adjuster means.

11. A range finder for a passive-type autofocusing device as recited in, claim 8 and further comprising means for position-adjustment of the pixel in each line sensor section providing the output signal which initiates write-in of the zero-cross point data to the associated zero-cross memory circuit so that a position at which the write-in to the zero-cross memory circuit may be adjusted by the adjuster means.

12. A range finder for a passive-type autofocusing device comprising:
a photosensor to pick up a luminance distribution on a scene to be photographed, the photosensor consisting of a single line sensor divided into three sections and three imaging lenses adapted to image the scene on the respective sections of the line sensor;

a single secondary difference computing circuit coupled to said photosensor to compute a secondary difference of an output signal from the line sensor;

a single zero-cross detecting circuit coupled to said difference computing circuit to detect zero-cross points of an output signal from the second difference computing circuit so long as these zero-cross points are those appearing when a primary difference derived from computation of the secondary difference has an absolute value larger than a predetermined value;

zero-cross memory circuit coupled to said detector circuit and associated with those three sections of the line sensor, respectively, to store zero-cross behavior signals obtained by the zero-cross detecting circuit; and a coincidence detecting circuit coupled to said memory circuits to compare the zero-cross behavior signals stored in the respective zero-cross memory circuits and thereby to detect a coincidence of these zero-cross behavior signals; wherein the secondary difference computing circuit smoothes output signals from pixels lying within a predetermined continuous extent in the photosensor and computes the difference based on output signals from the pixels lying beyond the extent having been subjected to smoothing; and wherein one of those three line sensor sections is selected as the reference line sensor section and the zero-cross behavior signals obtained from the other two line sensor sections are successively shifted with respect to the zero-cross behavior signal obtained from the reference line sensor section until a coincidence of these zero-cross behavior signals is detected by the coincidence detecting circuit and a range to the scene is computed based on an amount of such shifting.

13. A range finder for a passive-type autofocusing device as recited in claim 8 and further comprising means for position-adjustment of the pixel in each line sensor section providing the output signal which initiates write-in of the zero-cross point data to the associated zero-cross memory circuit so that a position at which the write-in to the zero-cross memory circuit may be adjusted by the adjuster means.

14. A range finder for a passive-type autofocusing device comprising:
   a photosensor to pick up a luminance distribution on a scene to be photographed, the photosensor consisting of a single line sensor divided into three sections and three imaging lenses adapted to image the scene on the respective sections of the line sensor;
   a single secondary difference computing circuit coupled to said photosensor to compute a secondary difference of an output signal from the line sensor;
   a single zero-cross detecting circuit coupled to said difference computing circuit to detect zero-cross points of an output signal from the secondary difference computing circuit so long as these zero-cross points are those appearing when a primary difference derived from computation of the secondary difference has an absolute value larger than a predetermined value;
   zero-cross memory circuits coupled to said detecting circuit and associated with those three sections of the line sensor, respectively, to store zero-cross behavior signals obtained by the zero-cross detecting circuit; and
   a coincidence detecting circuit coupled to said memory circuits to compare the zero-cross behavior signals stored in the respective zero-cross memory circuits and thereby to detect a coincidence of these zero-cross behavior signals; wherein there is further provided externally operable adjuster means for position-adjustment of the pixel in each line sensor section providing the output signal which initiates write-in of the zero-cross point data to the associated zero-cross memory circuit so that a position at which the write-in to the zero-cross memory circuit may be adjusted by the adjuster means; and wherein one of those three line sensor sections is selected as the reference line sensor section and the zero-cross behavior signals obtained from the other line sensor sections are successively shifted with respect to the zero-cross behavior signal obtained from the reference line sensor section until a coincidence of these zero-cross behavior signals is detected by the coincidence detecting circuit and a range to the scene is computed based on an amount of such shifting.

* * * * *

UNITED STATES PATENT AND TRADEMARK OFFICE
CERTIFICATE OF CORRECTION

PATENT NO. : 5,257,061  
DATED : October 26, 1993  
INVENTOR(S) : Minoru Ishiguro Page 1 of 2

It is certified that error appears in the above-indentified patent and that said Letters Patent is hereby corrected as shown below:

Column 5, line 20:
    After "circuit" delete --to--.

Column 5, line 54:
    After "circuits" delete --to--.

Column 5, line 58:
    After "circuits" delete --are stored--.

Column 5, line 62:
    After "behavior" insert --signals--.

Column 5, line 62:
    After "provided" insert --an--.

Column 6, line 46:
    After "is a" insert --voltage waveform--.

Column 6, line 47:
    After "is a" delete --voltage waveform--.

Column 6, line 47:
    After "of the" insert --program--.

Column 6, line 49:
    Before "data" delete --program--.

Column 7, lines 21 and 22:
    "autofocussing" should be --autofocusing--.

UNITED STATES PATENT AND TRADEMARK OFFICE
CERTIFICATE OF CORRECTION

PATENT NO. : 5,257,061
DATED : October 26, 1993
INVENTOR(S) : Minoru Ishiguro

It is certified that error appears in the above-indentified patent and that said Letters Patent is hereby corrected as shown below:

Column 7, line 24:
    Before "circuit" insert --schematic--.

Column 7, line 36:
    After "for" insert --a--.

Column 7, line 57:
    After "for" insert --a--.

Column 8, line 62:
    After "and" insert --the--.

Column 13, line 37:
    "on the" should be --of the--.

Column 26, line 13, claim 9:
    "extend" should be --extent--.

Column 26, line 49, claim 12:
    "circuit" should be --circuits--.

Signed and Sealed this

Twenty-seventh Day of September, 1994

Attest:

BRUCE LEHMAN

Attesting Officer      *Commissioner of Patents and Trademarks*